(12) United States Patent  (10) Patent No.: US 8,187,500 B2
Lewis et al.  (45) Date of Patent: May 29, 2012

(54) BIPHASIC INKS

(75) Inventors: Jennifer A. Lewis, Urbana, IL (US); Qi Li, Champaign, IL (US); Ranjeet Rao, Mountain View, CA (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 590 days.

(21) Appl. No.: 12/271,832

(22) Filed: Nov. 14, 2008

(65) Prior Publication Data

US 2010/0096596 A1    Apr. 22, 2010

Related U.S. Application Data

(60) Provisional application No. 61/106,440, filed on Oct. 17, 2008.

(51) Int. Cl.
*H01B 1/00* (2006.01)

(52) U.S. Cl. .................... 252/500; 106/31.13

(58) Field of Classification Search ............ 252/500; 424/401, 490; 516/90; 106/31.13
See application file for complete search history.

(56) References Cited

U.S. PATENT DOCUMENTS

| | | |
|---|---|---|
| 2,892,797 A | 6/1959 | Alexander et al. |
| 3,878,034 A | 4/1975 | Bever et al. |
| 4,178,270 A | 12/1979 | Fujita |
| 4,181,532 A | 1/1980 | Woodhead |
| 4,410,457 A | 10/1983 | Fujimura et al. |
| 4,414,354 A | 11/1983 | Slocombe |
| 4,426,356 A | 1/1984 | Nair |
| 4,446,174 A | 5/1984 | Nakamura et al. |
| 4,471,100 A | 9/1984 | Tsubakimoto et al. |
| 4,701,218 A | 10/1987 | Rowlands et al. |
| 4,818,614 A | 4/1989 | Fukui et al. |
| 4,946,904 A | 8/1990 | Akimoto et al. |
| 4,960,465 A | 10/1990 | Arfaei |
| 5,021,596 A | 6/1991 | Barfurth et al. |
| 5,100,984 A | 3/1992 | Burge et al. |
| 5,147,841 A | 9/1992 | Wilcoxon |
| 5,196,199 A | 3/1993 | Fuisz |
| 5,237,017 A | 8/1993 | Akiyama et al. |
| 5,238,625 A | 8/1993 | Sakurai et al. |
| 5,250,476 A | 10/1993 | Mogensen et al. |
| 5,284,894 A | 2/1994 | Wasyliw et al. |
| 5,344,487 A | 9/1994 | Whalen-Shaw |
| 5,369,198 A | 11/1994 | Albrecht et al. |
| 5,393,343 A | 2/1995 | Darwin et al. |
| 5,416,071 A | 5/1995 | Igari et al. |

(Continued)

FOREIGN PATENT DOCUMENTS

AU    B-64095/80    9/1982

(Continued)

OTHER PUBLICATIONS

Su, Ming et al., "Moving beyod Molecules: Patterning Solid-State Features via Dip-Pen Nanolithography with Sol-Based Inks", J. Am. Chem. Soc., vol. 124, No. 8, pp. 1560-1561, (2002).

(Continued)

*Primary Examiner* — Khanh Tuan Nguyen

(74) *Attorney, Agent, or Firm* — Brinks Hofer Gilson & Lione

(57) ABSTRACT

A biphasic ink comprises a plurality of attractive particles, a plurality of repulsive particles, and a carrier liquid.

24 Claims, 8 Drawing Sheets

U.S. PATENT DOCUMENTS

| | | | |
|---|---|---|---|
| 5,424,362 A | 6/1995 | Hwang et al. | |
| 5,424,364 A | 6/1995 | Simms et al. | |
| 5,424,466 A | 6/1995 | Stern et al. | |
| 5,424,467 A | 6/1995 | Bam et al. | |
| 5,424,477 A | 6/1995 | Higuchi et al. | |
| 5,429,761 A | 7/1995 | Havelka et al. | |
| 5,516,836 A | 5/1996 | Sauer et al. | |
| 5,545,280 A | 8/1996 | Wenz | |
| 5,556,460 A | 9/1996 | Berke et al. | |
| 5,597,871 A | 1/1997 | Auschra et al. | |
| 5,607,892 A | 3/1997 | Chopin et al. | |
| 5,643,247 A | 7/1997 | Fernandez et al. | |
| 5,646,200 A | 7/1997 | Duncan | |
| 5,651,986 A | 7/1997 | Brem et al. | |
| 5,654,006 A | 8/1997 | Fernandez et al. | |
| 5,665,158 A | 9/1997 | Darwin et al. | |
| 5,753,037 A | 5/1998 | Drs et al. | |
| 5,753,261 A | 5/1998 | Fernandez et al. | |
| 5,800,922 A | 9/1998 | Anderson et al. | |
| 5,811,124 A | 9/1998 | Fernandez et al. | |
| 5,820,879 A | 10/1998 | Fernandez et al. | |
| 5,883,196 A | 3/1999 | Rath et al. | |
| 5,891,313 A | 4/1999 | Johnson et al. | |
| 5,957,828 A | 9/1999 | Hayashi | |
| 5,958,858 A | 9/1999 | Bettiol et al. | |
| 5,962,608 A | 10/1999 | Ryang et al. | |
| 6,008,181 A | 12/1999 | Cripe et al. | |
| 6,015,781 A | 1/2000 | Vinson et al. | |
| 6,020,303 A | 2/2000 | Cripe et al. | |
| 6,027,326 A | 2/2000 | Cesarano, III et al. | |
| 6,051,636 A | 4/2000 | Johnson et al. | |
| 6,060,443 A | 5/2000 | Cripe et al. | |
| 6,080,216 A | 6/2000 | Erickson | |
| 6,093,856 A | 7/2000 | Cripe et al. | |
| 6,103,868 A | 8/2000 | Heath et al. | |
| 6,107,409 A | 8/2000 | Hogan et al. | |
| 6,127,094 A | 10/2000 | Victor et al. | |
| 6,133,222 A | 10/2000 | Vinson et al. | |
| 6,133,227 A | 10/2000 | Barnabas et al. | |
| 6,136,333 A | 10/2000 | Cohn et al. | |
| 6,136,428 A | 10/2000 | Truong et al. | |
| 6,136,769 A | 10/2000 | Asano | |
| 6,139,623 A | 10/2000 | Darwin et al. | |
| 6,150,459 A | 11/2000 | Mayes et al. | |
| 6,153,577 A | 11/2000 | Cripe et al. | |
| 6,165,406 A | 12/2000 | Jang et al. | |
| 6,167,910 B1 | 1/2001 | Chow | |
| 6,207,749 B1 | 3/2001 | Mayes et al. | |
| 6,211,249 B1 | 4/2001 | Cohn et al. | |
| 6,228,829 B1 | 5/2001 | Vinson et al. | |
| 6,242,406 B1 | 6/2001 | Katsuda et al. | |
| 6,258,161 B1 | 7/2001 | Kerkar et al. | |
| 6,262,129 B1 | 7/2001 | Murray et al. | |
| 6,277,191 B1 | 8/2001 | Budiansky et al. | |
| 6,321,791 B1 | 11/2001 | Chow | |
| 6,379,974 B1 | 4/2002 | Parce et al. | |
| 6,395,804 B1 | 5/2002 | Gaddam et al. | |
| 6,436,167 B1 | 8/2002 | Chow et al. | |
| 6,441,054 B1 | 8/2002 | Ou et al. | |
| 6,451,433 B1 | 9/2002 | Oka et al. | |
| 6,465,257 B1 | 10/2002 | Parce et al. | |
| 6,471,761 B2 | 10/2002 | Fan et al. | |
| 6,499,499 B2 | 12/2002 | Dantsker et al. | |
| 6,517,199 B1 | 2/2003 | Tomioka et al. | |
| 6,572,673 B2 | 6/2003 | Lee et al. | |
| 6,595,232 B2 | 7/2003 | Guzman et al. | |
| 6,596,545 B1 | 7/2003 | Wagner et al. | |
| 6,599,647 B2 | 7/2003 | Oguri et al. | |
| 6,645,444 B2 | 11/2003 | Goldstein | |
| 6,670,415 B2 | 12/2003 | Jardine et al. | |
| 6,673,285 B2 | 1/2004 | Ma | |
| 6,746,510 B2 | 6/2004 | Kurihara et al. | |
| 6,861,205 B2 | 3/2005 | Bowman et al. | |
| 6,878,184 B1 | 4/2005 | Rockenberger et al. | |
| 6,929,675 B1 | 8/2005 | Bunge et al. | |
| 6,942,825 B2 | 9/2005 | Honda et al. | |
| 6,974,493 B2 | 12/2005 | Harutyunyan et al. | |
| 7,053,125 B2 * | 5/2006 | Lewis et al. | 516/90 |
| 7,081,322 B2 | 7/2006 | Ray et al. | |
| 7,141,617 B2 | 11/2006 | Gratson et al. | |
| 7,160,525 B1 | 1/2007 | Peng et al. | |
| 7,198,736 B2 | 4/2007 | Kasuga et al. | |
| 2001/0049912 A1 | 12/2001 | Motonari et al. | |
| 2002/0015846 A1 | 2/2002 | Evans et al. | |
| 2002/0016387 A1 | 2/2002 | Shen | |
| 2002/0121229 A1 | 9/2002 | Jardine et al. | |
| 2002/0147282 A1 | 10/2002 | Mayes et al. | |
| 2002/0182171 A1 | 12/2002 | Detert et al. | |
| 2002/0195747 A1 | 12/2002 | Hull et al. | |
| 2003/0032727 A1 | 2/2003 | Narayan-Sarathy et al. | |
| 2003/0091647 A1 * | 5/2003 | Lewis et al. | 424/490 |
| 2003/0162004 A1 | 8/2003 | Mirkin et al. | |
| 2003/0177690 A1 | 9/2003 | Wittkowski et al. | |
| 2004/0076822 A1 | 4/2004 | Jagota et al. | |
| 2004/0096469 A1 * | 5/2004 | Lewis et al. | 424/401 |
| 2004/0161544 A1 | 8/2004 | Kasperchik | |
| 2004/0226620 A1 | 11/2004 | Therriault et al. | |
| 2005/0004261 A1 | 1/2005 | Yatake | |
| 2005/0189520 A1 | 9/2005 | Okada et al. | |
| 2005/0196605 A1 | 9/2005 | Ramsey | |
| 2006/0235105 A1 | 10/2006 | Gratson et al. | |
| 2006/0239902 A1 | 10/2006 | Kimura et al. | |
| 2007/0172588 A1 | 7/2007 | Therriault et al. | |
| 2007/0228335 A1 | 10/2007 | Gratson et al. | |
| 2008/0245266 A1 | 10/2008 | Lewis et al. | |
| 2009/0000678 A1 | 1/2009 | Therriault et al. | |

FOREIGN PATENT DOCUMENTS

| | | |
|---|---|---|
| DE | 2052749 | 5/1972 |
| EP | 362770 A2 | 4/1990 |
| EP | 0 263 490 B1 | 1/1995 |
| GB | 2094820 A | 9/1982 |
| WO | WO 97/19711 A1 | 6/1997 |
| WO | WO 99/51335 | 10/1999 |
| WO | WO 00/47628 A | 8/2000 |
| WO | WO 01/89787 A2 | 11/2001 |
| WO | WO 02/20627 A | 3/2002 |
| WO | WO/2004/043853 | 5/2004 |
| WO | WO 2005/000977 | 1/2005 |

OTHER PUBLICATIONS

Technical Bulletin: Pluronic P123 Block Copolymer Surfactant, BASF, 1 page, (2004).

Pierre, A.C., "Introduction to Sol-Gel Processing", Kluwer Academic Publishers, Boston, pp. 2-3, (1998).

Xu, P. "Polymer-ceramic nanocomposites: Ceramic phases", Encyclopedia of Materials: science and Technology, pp. 1-6, Pergamon Press, (2001).

Caracoche, et al., "Zirconium oxide structures prepared by the sol-gel route: 1, The role of the alcoholic solvent", Journal of the American Ceramics Society, vol. 83, No. 2, pp. 377-384, (2000).

ADVA® Flow Superplasticizer ASTM C494, Type F (carboxylated polyether) with Material Safety Data Sheet (MSDS), Grace Construction Products 10 p., 2002.

Anderson, J.R., et al., "Fabrication of Topologically Complex Three-Dimensional Microfluidic Systems in PDMS by Rapid Prototyping", Anal. Chem. 72, pp. 3158-3164, 2000.

Aref, H., "The Development of Chaotic Advection", Phys. Fluids 14, pp. 1315-1325, 2002.

Axim Italcementi Group, Catexol™ Superflux 2000 PC, with Material Safety Data Sheet (MSDS), 7 p., Nov. 13, 2002.

Bautista, F. et al., "Understanding Thixotropic and Antithixotropic Behavior of Viscoelastic Micellar Solutions and Liquid Crystalline Dispersions. I. The Model." Journal of Non-Newtonian Fluid Mechanics, vol. 80, pp. 93-113, 1999.

Bell, Nelson, et al., "Cation-Induced Collapse of Low-Molecular-Weight Polyacrylic Acid in the Dispersion of Barium Titanate", Journal of Colloid and Interface Science, 254, pp. 296-305, 2002.

Berg, J.M., et al., "Interactions between Mica Surfaces in Sodium Polyacrylate Solutions Containing Calcium Ions", Journal of Colloid and Interface Science, 161, pp. 182-189, 1993.

Breitenbach, A., et al. "Branched biodegradable polyesters for parenteral drug delivery systems", Journal of Controlled Release, vol. 64, pp. 167-178, 2000.

Burns, M.A., et al., "An Integrated Nanoliter DNA Analysis Device" Science 282, pp. 484-487, 1998.

Campbell, et al., "Fabrication of Photonic Crystals for the Visible Spectrum by Holographic Lithography," Nature, pp. 53-56, vol. 404, 2000.

Caruso et al., "Nanoengineering of Inorganic and Hybrid Hollow Spheres by Colloidal Templating," Science, pp. 1111-1114, vol. 282, 1998.

Cassagneau et al., "Conjugated Polymer Inverse Opals for Potentiometric Biosensing," Adv. Mater., pp. 1837-1841, vol. 14, 2002.

Cesarano III, Joseph et al., "Processing of Highly Concentrated Aqueous α-Alumina Suspensions Stabilized with Polyelectrolytes", J. Am. Ceram. Soc., vol. 71 No. 12, pp. 1062-1067, 1988.

Cesarano III, Joseph, et al., "Stability of Aqueous α-$Al_2O_3$ Suspensions with Poly(methacrylic acid) Polyelectrolyte", J. Am. Ceram. Soc., vol. 71, No. 4, pp. 250-255, 1988.

Chabinyc, M.L., et al., "An Integrated Fluorescence Detection System in Poly(dimethylsiloxane) for Microfluidic Applications" Anal. Chem. 73, pp. 4491-4498, 2001.

Chen et al., "Geometric Control of Cell Life and Death," Science, pp. 1425-1428, vol. 276, 1997.

Abstract of Sakai et al., "Influence of various types of inorganic salts on dispersion mechanisms of comb-type polymer containing grafted polyethylene oxides chains," Journal of the Ceramic Society of Japan, vol. 108, No. 10, pp. 904-908, 2000.

Choi, J.W., et al., "An Active Microfluidic Mixer for Mixing of Microparticles and Liquids"; SPIE Proceedings 4177, The International Society for Optical Engineering, pp. 154-161, 2000.

Chou, H.P., et al., "A Microfabricated Device for Sizing and Sorting DNA Molecules", Proc. Natl. Acad. Sci. 96, pp. 11-13, 1999.

Chrisey et al., "Materials Processing: The Power of Direct Writing," Science, vol. 289, pp. 879-881, 2000.

Clark et al., "Creating Microstructures of Luminescent Organic Thin Films Using Layer-by-Layer Assembly," Adv. Mater., pp. 1031-1035, vol. 11, 1999.

Cumpston et al., "Two-Photon Polymerization Initiators for Three-Dimensional Optical Data Storage and Microfabrication," Nature, pp. 51-54, vol. 398, 1999.

Dahlgren, M., "Effect of Counterion Valency and Ionic Strength on Polyelectrolyte Adsorption" Langmuir vol. 10, No. 5, pp. 1580-1583, 1994.

De L. Costello, et al., "Experimental investigations of the interaction forces in concentrated dispersions", Colloids and Surfaces A: Physiochemical and Engineering Aspects, 77, pp. 55-63, 1993.

Decher, "Fuzzy Nanoassemblies: Toward Layered Polymeric Multicomposites," Science, pp. 1232-1237, vol. 277, 1997.

Demers et al., "Direct Patterning of Modified Oligonucleotides on Metals and Insulators by Dip-Pen Nanolithography," Science, pp. 1836-1838, vol. 296, 2002.

Fan, H., "Rapid Prototyping of Patterned Functional Nanostructures," Nature, vol. 405, pp. 56-60, 2000.

Feiertag et al., "Fabrication of Photonic Crystals by Deep X-Ray Lithography," Appl. Phys. Lett., pp. 1441-1443, vol. 71, 1997.

Fery et al., "Nanoporous Thin Films Formed by Salt-Induced Structural Changes in Multilayers of Poly(acrylic Acid) and Poly(allylamine)," Langmuir, pp. 3779-3783, vol. 17, 2001.

Foresi et al., "Photonic-Bandgap Microcavities in Optical Waveguides," Nature, pp. 143-145, vol. 390, 1997.

Hadjichristidis, N., "Polymers with Complex Architecture by Living Anionic Polymerization", Chem. Rev. vol. 101, pp. 3747, 3771-3775, 2001.

Jacoby, Mitch, 3-D Structures From Stable Gels:, Chemical & Engineering News, vol. 80, No. 26, p. 7, Jul. 1, 2002.

Jeon, N.L., et al., "Generation of Solution and Surface Gradients Using Microfluidic Systems", Langmuir 16, pp. 8311-8316, 2000.

Jiang et al., "Exploring the Rules for Selective Deposition: Interactions of Model Polyamines on Acid and Oligoethylene Oxide Surfaces," Langmuir, pp. 1131-1143, vol. 18, 2002.

Jiang et al., "Polymer-On-Polymer Stamping: Universal Approaches to Chemically Patterned Surfaces," Langmuir, pp. 2607-2615, vol. 18, 2002.

Jones, S.W., "Interaction of Chaotic Advection and Diffusion", Chaos Applied to Fluid Mixing, Aref, H. and El Naschie, M.S., eds., pp. 185-196, 1995.

Kenny, Jack, "Digital Printing: The Excitement Grows", www.labelandnarrowweb.com, pp. 1-5, Nov. 2000.

Kenny, Jack, "Specialty Ink", www.labelandnarrowweb.com, pp. 1-4, Sep. 2003.

Kiriy et al., "Cascade of Coil-Globule Conformational Transitions of Single Flexible Polyelectrolyte Molecules in Poor Solvent," J. Am. Chem. Soc., pp. 13454-13462, vol. 124, 2002.

Laarz, E. et al., "The Effect of Anionic Polyelectrolytes on the Properties of Aqueous Silicon Nitride Suspensions", Journal of the European Ceramic Society, vol. 20, pp. 431-440, 2000.

Label & Narrow Web, "Specialty Inks", pp. 1-14., Nov. 2000.

Landers et al., "Rapid Prototyping of Scaffolds Derived from Thermoreversible Hydrogels and Tailored for Applications in Tissue Engineering," Biomaterials, pp, 4437-4447, vol. 23, 2002.

Lazaris et al., "Spider Silk Fibers Spun from Soluble Recombinant Silk Produced in Mammalian Cells," Science, pp. 472-476, vol. 295, 2002.

Lee et al., "Multi-Photon Polymerization of Waveguide Structures Within Three-Dimensional Photonic Crystals," Adv. Mater., pp. 271-274, vol. 14, 2002.

Lewis, "Direct-Write Assembly of Ceramics from Colloidal Inks," Curr. Opin. Solid State Mat. Sci., pp. 245-250, vol. 6, 2002.

Li, C., et al., "Effect of a comb-like amphiphilic polymer on the stability of alumina dispersions", Colloids and Surfaces, 69, pp. 155-158, 1992.

Li, Chia-Chen, et al., "Interaction between Dissolved Ba2+ and PAA-NH4 Dispersant in Aqueous Barium Titanate Suspensions", Journal of the American Ceramic Society, vol. 85, No. 6, pp. 1449-1455, 2002.

Lin et al., "A Three-Dimensional Photonic Crystal Operating at Infrared Wavelengths," Nature, pp. 251-253, vol. 394, 1998.

Loctite Corporation Prussian Blue, Material Safety Data Sheet dated Jan. 6, 2002, 5 pages; http://www.loctite.com/datasheets/msds/30520.html, Jan. 14, 2002.

LOCTITE® Product Description Sheet Prussian Blue, Maintenance, Repair & Operations, 1p, Jan. 1999.

Losey, M.W., et al., "Microfabricated Multiphase Packed-Bed Reactors: Characterization of Mass Transfer and Reactions", Ind. Eng. Chem. Res. 40, pp. 2555-2562, 2001.

Mas, R., et al., "Rheology of Colloidal Suspensions: Case of Lubricating Greases," Journal of Rheology, vol. 38, No. 4, pp. 889-908, 1994.

Meier-Haack et al., "Pervaporation Separation of Water/Alcohol Mixtures Using Composite Membranes Based on Polyelectrolyte Multilayer Assemblies," J. Membr. Sci., pp. 233-243, vol. 184, 2001.

Moore, S.K., "Microfluidics for Complex Computation", IEEE Spectrum 38, pp. 28-29, 2001.

Napper, Donald H., "Polymeric Stabilization of Colloidal Dispersions" Academic Press, Inc., pp. 28-30, 1983.

Noda et al., "Full Three-Dimensional Photonic Bandgap Crystals at Near-Infrared Wavelengths," Science, pp. 604-606, vol. 289, 2000.

Orgeret-Ravanat, C. et al., "Adsorption/Desorption of a PEO-rich Comb-like Polymer at a Silica/Aqueous Solution Interface", Colloids and Surfaces vol. 33, pp. 109-119, 1988.

Piner et al., "Dip-Pen Nanolithography," Science, pp. 661-663, vol. 283, 1999.

Polymer Source, Inc., Information Sheet—Custom Synthesis, comb polymer (poly(acrylic acid) backbone and poly(ethylene oxide) teeth), 2 p., Nov. 13, 2002.

Reed, James S., "Principles of Ceramic Processing", $2^{nd}$ Ed., John Wiley & Sons, Inc., pp. 525-541, 1995.

Sakai, E., et al., "Dispersion Mechanisms of Comb-Type Superplasticizers Containing Grafted Poly(ethylene oxide) Chains", Macromol. Symp. 175, pp. 367-376, 2001.

Schwartz, Steven A., "Gypsum Dispersing Agents", Global Gypsum Conference, pp. 1-10, 2002.

Seidel et al., "Artificial Spinning of Spider Silk," Macromolecules, pp. 6733-6736, vol. 31, 1998.

Silkroad C&T:Admixtures for Concrete, PEMA-200N, Product Information Sheet, 2 p., 2002.

Smay et al., "Colloidal Inks for Directed Assembly of 3-D Periodic Structures," Langmuir, pp. 5429-5437, vol. 18, 2002.

Smay et al., "Directed Colloidal Assembly of 3D Periodic Structures," Adv. Mater., pp. 1279-1283, vol. 14, 2002.

Smay, James E., et al., "Colloidal Inks for Directed Assembly of 3-D Periodic Structures", Langmuir, pp. 5429-5437, vol. 18, No. 14, 2002.

Stenius, P. et al., "Aggregation in concentrated kaolin suspensions stabilized by polyacrylate", Colloids and Surfaces, vol. 51, pp. 219-238, 1990.

Stromberg, A., et al., "Microfluidic Device for Combinatorial Fusion of Liposomes and Cells", Anal. Chem. 73, pp. 126-130 2001.

Sukhishvili et al., "Layered, Erasable, Ultrathin Polymer Films," J. Am. Chem. Soc., pp. 9550-9551, vol. 122, 2000.

Takemoto Oil & Fat Co. Ltd. Product Information Sheet, 2 p., Nov. 13, 2002.

Tobori, N. et al., "Rheological behavior of highly concentrated aqueous calcium carbonate suspensions in the presence of polyelectrolytes", Colloids and Surfaces A: Physiochem. Eng. Aspects 00, pp. 1-9, 2002; (2 pages)—vol. 215, pp. 163-171, 2003.

Uhrig, D., et al., "Synthesis of Combs, Centipedes, and Barbwires: Poly(isoprene-graft-styrene) Regular Multigraft Copolymers with Trifunctional, Tetrafunctional, and Hexafunctional Branch Points", Macromolecules vol. 35, pp. 7182-7190, 2002.

Vermohlen, K., et al., "Adsorption of polyelectrolytes onto oxides—the influence of ionic strength, molar mass, and Ca2+ ions", Colloids and Surfaces A: Physicochem. Eng. Aspects 163, pp. 45-53, 2000.

Vlasov et al., "On-Chip Natural Assembly of Silicon Photonic Bandgap Crystals," Nature, pp. 289-293, vol. 414, 2001.

Vollrath et al., "Liquid Crystalline Spinning of Spider Silk," Nature, pp. 541-548, vol. 410, 2001.

White, S.R., et al., "Autonomic Healing of Polymer Composites", Nature 409, pp. 794-797, 2001.

Wu et al., "Fabrication of Complex Three-Dimensional Microchannel Systems in PDMS," J. Am. Chem. Soc., pp. 554-559, vol. 125, 2003.

Xia et al., "Soft Lithography," Angew. Chem Int. Ed., pp. 550-575, vol. 37, 1998.

Zezin et al., "A New Class of Complex Water-Soluble Polyelectrolytes," Russ. Chem. Rev., pp. 833-855, vol. 51, 1982.

Allahyarov, E. et al., "Attraction between Like-Charged Macroions by Coulomb Depletion", Physical Review Letters, vol. 81, No. 6, pp. 1334-1337, 1998.

Allahyarov, E. et al., "Effective forces between macroions: The cases of asymmetric macroions and added salt", Physical Review E, vol. 57, No. 5, pp. 5818-5824, 1998.

BIC, "Zeta Potential Applications", article from the Internet, http://www.bic.comfZetaPotentialApplications.htm>, 4 pages, printed Sep. 14, 2001.

Braun, Paul V. et al., "Electrochemical Fabrication of 3D Microperiodic Porous Materials", Advanced Materials, vol. 13, No. 7, pp. 482-485, 2001.

Braun, Paul V. et al., "Electrochemically grown photonic crystals", Nature, vol. 402, pp. 603-604, 1999.

Braun, Paul V. et al., "Optical spectroscopy of high dielectric contrast 3D photonic crystals", Europhys. Lett., vol. 56, pp. 207-213, 2001.

CAMP Annual Report 2000, "Colloidal Dispersions and Processing", Center for Advanced Materials Processing, 2000, article from the Internet, http://www.clarkson.edu/camp/annual_report/page6.htm>, 2 pages, printed Sep. 14, 2001.

Ferreira, Paula G. et al., "Mixtures of charged colloids and nonadsorbing flexible polyelectrolytes: An integral equation study", J. Chem. Phys., vol. 113, No. 21, pp. 9849-9862, 2000.

Garibay-Alonso, R. et al., "Phase separation of binary liquid mixtures of hard spheres and Yukawa particles", Physica A, vol. 235, pp. 159-169, 1997.

Malvern, "The use of the Malvern Zetasizer for the measurement of Zeta Potential", article from the Internet, http://www.malvern.co.alLaboratory/zetaintm.htm>, 10 pages, printed on Feb. 12, 2002.

Malvern, "Zeta Potential Theory, Dispersion stability", article from the Internet, http://www.malvern.co.uk/Laboratory/zettheo.htm>, 3 pages, printed on Feb. 12, 2002.

Mendez-Alcaraz, J.M. et al., "Depletion forces in colloidal mixtures", Physical Review E, vol. 61, No. 4, pp. 4095-4099, 2000.

Mendez-Alcaraz, J.M. et al., "Structural properties of colloidal suspensions", Physica A, vol. 220, pp. 173-191, 1995.

Mendez-Alcaraz, J.M. et al., "Structure of Binary Colloidal Mixtures of Charged and Uncharged Spherical Particles", Langmuir, vol. 8, pp. 2913-2920, 1992.

Nguyen, T. T. et al., "Macroions in Salty Water with Multivalent Ions: Giant Inversion of Charge", Physical Review Letters, vol. 85, No. 7, pp. 1568-1571, 2000.

Ramakrishnan, S. et al., "Characterizing nanoparticle interactions: Linking models to experiments", J. Chem. Phys., vol. 113, No. 3, pp. 1237-1248, 2000.

Rouzina, Ioulia et al., "Macroion Attraction Due to Electrostatic Correlation between Screening Counterions. 1. Mobile Surface-Adsorbed Ions and Diffuse Ion Cloud", J. Chem. Phys., vol. 100, No. 23, pp. 9977-9989, 1996.

The Sol-Gel Gateway, "Suppliers-Colloidal solutions and nanoparticles", article from the Internet, http://www.solgel.com/precursors/sols.htm>, 3 pages, printed on Sep. 14, 2001.

Tohver, Valeria, "Nanoparticle Engineering of Complex Fluid Behavior", Langmuir, vol. 17, No. 26, pp. 8414-8421, 2001.

Tohver, Valeria, "Nanoparticle halos: A new colloid stabilization mechanism", PNAS, vol. 98, No. 16, pp. 8950-8954, 2001.

Verhaegh, Nynke et al., "Transient gelation by spinodal decomposition in colloid-polymer mixtures", Physica A, vol. 242, pp. 104-118, 1997.

Verhaegh, Nynke et al., "Transient gels in colloid-polymer mixtures studied with fluorescence confocal scanning laser microscopy", Physica A, vol. 264, pp. 64-74, 1999.

Weeks, James R., "Formation and collapse of gels of sterically stabilized colloidal particles", J Phys. Condens. Matter, vol. 12, pp. 9599-9606, 2000.

Wessling, Dr. Berhard, "Conductive Polymer / Solvent Systems: Solutions or Dispersions?", Zipperling Kessler/ Ormecon Chemie, dated 1996, article from the Internet, http://www.zipperling.de/Research/soludisp/kap13.html>, 2 pages, printed Sep. 14, 2001.

Vincent, B. et al., "Adsorption of Small, Positive Particles onto Large, Negative Particles in the Presence of Polymer", J.C.S. Faraday I, V. 76, Iss. 3, pp. 665-673, 1980.

Luckham, P.F., et al., "The Controlled Flocculation of Particulate Dispersions Using Small Particles of Opposite Charge. III. Investigation of Floc Structure Using Rheological Techniques", Colloids and Surfaces, vol. 6, pp. 101-118, 1983.

Hawley's Condensed Chemical Dictionary, Eleventh Edition, edited by Sax and Lewis, Sr. (Van Nostrand Reinhold Company, New York, NY, copyright 1987),p. 25, (Oct. 1989).

Michna, S. et al., "Concentrated hydroxyapatite inks for direct-write assembly of 3-D periodic scaffolds", Biomaterials, vol. 26, pp. 5632-5639, (2005).

Deubel, M. et al., "Direct laser writing of three-dimensional photonic-crystal templates for telecommunications", Nature Materials, vol. 3, pp. 444-447, (2004).

Kim, I. et al., "Ultrasensitive chemiresistors based on electrospun $TiO_2$ nanofibers", NanoLetters, vol. 6, No. 9, pp. 2009-2013, (2006).

Ding, X-Z. et al., "Effect of tin dioxide doping on rutile phase formation in sol-gel-derived nanocrystalline titania powders", NanoStructured Materials, vol. 4, No. 6, pp. 663-668, (1994).

Chutinan, A. et al., "Highly confined waveguides and waveguide bends in three-dimensional photonic crystal", Applied Physics Letters, vol. 75, No. 24, pp. 3739-3741, (1999).

Cotton, F.A. et al., Advanced Inorganic Chemistry, Fifth Edition, ed. John Wiley & sons, pp. 215-217, pp. 781-782, 7 pages total, (1988).

Seet, K.K. et al., "Three-dimensional spiral-architecture photonic crystals obtained by direct laser writing", Advanced Materials, vol. 17, No. 5, pp. 541-545, (2005).

Morissette, S.L. et al., "Solid freeform fabrication of aqueous alumina-poly(vinyl alcohol) gelcasting suspensions", Journal of the American Ceramic Society, vol. 83, No. 10, pp. 2409-2416, (2000).

Morrissette, S.L. et al., "Chemorheology of aqueous-based alumina-poly(vinyl alcohol) gelcasting suspensions", Journal of the American Ceramic Society, vol. 82, No. 3, pp. 521-528, (1999).

Kozuka H. et al., "Crack-free thick ceramic coating films via non-repetitive dip-coating using polyvinylpyrrolidone as stress-relaxing agent", Journal of Sol-Gel Science and Technology, vol. 19, pp. 205-209, (2000).
DuPont Tyzor Organic Titanates General Brochure found at http://www.dupont.com/tyzor, 12 pages, (2001).
Duoss, E.B. et al, "Sol-gel inks for direct-write assembly of functional oxides", Adv. Mater, vol. 19, pp. 3485-3489, (2007).
Weeks, E.R. et al., "Three-Dimensional Direct Imaging of Structural Relaxation Near the Colloidal Glass Transition", Science, vol. 287, pp. 627-631, (2000).
Manley, S. et al., "Glasslike Arrest in Spinodal Decomposition as a Route to Colloidal Gelation", Phys. Rev. Lett., 95, Art. No. 238302, pp. 238302-1 thru 23802-4, (2005).
Trappe, V. et al., "Jamming phase diagram for attractive particles", Nature, vol. 411, pp. 772-775, (2001).
Anderson, V.J. et al., "Insights into phase transition kinetics from colloid science", Nature, vol. 416, pp. 811-815, (2002).
Lewis, J.A., Colloidal Processing of Ceramics. J. Am. Ceram. Soc., 83, (10), pp. 2341-2359, (2000).
Martinez, C.J. et al., "Shape Evolution and Stress Development During Latex-Silica Film Formation", Langmuir, 18, pp. 4689-4698, (2002).
Fichtner, M. et al., "Small Ti clusters for catalysis of hydrogen exchange in NaAlH4. Nanotechnology", 14, (7), pp. 778-785, (2003).
Kim, A.S. et al, "Cake resistance of aggregates formed in the diffusion-limited-cluster-aggregation (DLCA) regime", J. Membrane Science, 286, pp. 260-268, (2006).
Weitz, D.A. et al., "Fractal Structures Formed by Kinetic Aggregation of Aqueous Gold Colloids", Phys. Rev. Lett., 52, pp. 1433-1436, (1984).
Carpineti, M. et al., "Transition from Semiorder to Disorder in the Aggregation of Dense Colloidal Solutions", Phys. Rev. Lett., 70, (24), pp. 3828-3830, (1993).
Chen, M. et al., "Characteristics of Flocculated Silica Dispersions", J. Colloid Interface Sci., 141, pp. 564-577, (1991).
Varadan, P. et al., "Direct visualization of long range structural heterogeneity in colloidal gels", Langmuir, 19, pp. 509-512 (2003).
Hütter, M., "Local Structure Evolution in Particle Network Formation Studied by Brownian Dynamics Simulation", J. Colloid and Interface Sci., 231, pp. 337-350, (2000).
Dinsmore, A.D. et al., "Microscopic Structure and Elasticity of Weakly Aggregated Colloidal Gels", Phys. Rev. Lett., 96, Art. No. 185502, pp. 185502-1 thru 185502-4, (2006).
Ramakrishnan, S. et al. "Microstructure and Rheology of Thermoreversible Nanoparticle Gels", Langmuir, 22, pp. 7833-7842, (2006).
Ramakrishnan, S. et al., "Clustering and mechanics in dense depletion and thermal gels", Langmuir, 21, pp. 9917-9925, (2005).
Chung, B. et al. "Microscopic Dynamics of Recovery in Sheared Depletion Gels", Phys. Rev. Lett., 96, Art. No. 228301, pp. 228301-1 thru 228301-4, (2006).
Krall, A.H. et al., "Internal Dynamics and Elasticity of Fractal Colloidal Gels", Phys. Rev. Lett., 80, (4), pp. 778-781, (1998).
Weeks, E.R. et al., "Properties of cage rearrangements observed near the colloidal glass transition", Phys. Rev. Lett., 89, (Art. No. 095704), pp. 095704-1 thru 095704-4, (2002).
Puertas, A.M. et al., "Dynamical heterogeneities close to a colloidal gel", J. Chem. Phys., 121, (6), pp. 2813-2822, (2004).
Puertas, A.M. et al., "Mode Coupling and Dynamical Heterogeneity in Colloidal Gelation A Simulation Study", J. Phys. Chem. B, 109, pp. 6666-6675, (2005).
Kegel, W.K. et al., "Direct Observation of Dynamical Heterogeneities in Colloidal Hard-Sphere Suspensions", Science, 287, pp. 290-293, (2000).
Crocker, J.C., "Methods of Digital Video Microscopy for Colloidal Studies", J. Colloid and Interface Sci., 179, pp. 298-310, (1996).
Dinsmore, A.D. et al., "Direct imaging of three-dimensional structure and topology of colloidal gels", J. Phys. Cond. Matter, 14, pp. 7581-7597, (2002).
Dibble, C.J. et al., "Structure and dynamics of colloidal depletion gels: Coincidence of transitions and heterogeneity", Phys. Rev. E., 74, Art. No. 041403, pp. 041403-1 thru 041403-11 (2006).
Leunissen, M.E. et al. "Ionic colloidal crystals of oppositely charged particles", Nature, 437, (8), pp. 235-240, (2005).
Van Blaaderen, A. et al., "Template-directed colloidal crystallization", Nature, 385, pp. 321-324, (1997).
Lee, W. et al., "Nanoparticle-Mediated Epitaxial Assembly of Colloidal Crystals on Patterned Substrates", Langmuir, 20, pp. 5262-5270, (2004).
Solomon, T. et al., "Stacking fault structure in shear-induced colloidal crystallization", J. Chem Phys., 124, Art. No. 134905, pp. 134905-1 thru 134905-10, (2006).
Schall, P. et al., "Visualization of Dislocation Dynamics in Colloidal Crystals", Science, 305, pp. 1944-1948, (2004).
Mohraz, A. et al., "Direct Visualization of Colloidal Rod Assembly by Confocal Microscopy", Langmuir, 21, pp. 5298-5306, (2005).
Pham, K.N. et al., "Multiple Glassy States in a Simple Model System", Science, 296, pp. 104-106, (2002).
Segre, P.N.; "Glasslike kinetic arrest at the colloidal-gelation transition", Phys. Rev. Lett., 86, (26), pp. 6042-6045, (2001).
Scheidler, P. et al., "Cooperative motion and growing length scales in supercooled confined liquids", Europhys. Letters, 59 (5), pp. 701-707, (2002).
Kim, K. et al., "Apparent finite-size effects in the dynamics of supercooled liquids", Phys. Rev. E, 61, (1), pp. R41-R44, (2000).
Malek, K. et al., "Effects of surface roughness on self- and transport diffusion in porous media in the Knudsen regime", Phys. Rev. Lett., 87, (12), Art. No. 125505, pp. 125505-1 thru 125505-4, (2001).
Elimelech, M. et al., "Kinetics of Deposition of Colloidal Particles in Porous Media", Environmental Science and Technology, 24, pp. 1528-1536, (1990).
Bogush, G.H. et al., "Preparation of monodisperse silica particles: Control of size and mass fraction", Journal of Non-Crystalline Solids, 104, pp. 95-106, (1988).
van Blaaderen, A. et al., "Synthesis and Characterization of Colloidal Dispersions of Fluorescent, Monodisperse Silica Spheres", Langmuir, 8, pp. 2921-2931, (1992).
Dinsmore, A.D. et al. "Three-dimensional confocal microscopy of colloids", Appl. Opt., 40, (24), pp. 4152-4159, (2001).
Baxter, R.J., "Percus-Yevick equation for hard spheres with surface adhesion", J. Chem. Phys. 49, pp. 2770-2774, (1968).
Shih, W-H, et al., "Scaling behavior of the elastic properties of colloidal gels", Phys. Rev. A, 42, (8), pp. 4772-4779, (1990).
de Rooij, R. et al., "Elasticity of weakly aggregating polystyrene latex dispersions", Phys. Rev. E, 49, (4), pp. 3038-3049, (1994).
Potanin, A.A. et al., "Microrheological modeling of weakly aggregated dispersions", J. Chem. Phys., 102, (14), pp. 5845-5853, (1995).
Wolthers, W. et al. "Linear viscoelastic behavior of aggregated colloidal dispersions", Phys. Rev. E, 56, (5), pp. 5726-5733, (1997).
Mellema, M. et al., "Categorization of rheological scaling models for particle gels applied to casein gels", J. Rheol., 46, (1), pp. 11-29, (2002).
Mohraz, A. et al, "Orientation and rupture of fractal colloidal gels during start-up of steady shear flow", J. Rheology, 49, (3), pp. 657-681, (2005).
Eckert, T. et al., "Re-entrant Glass Transition in a Colloid-Polymer Mixture with Depletion Attractions", Phys. Rev. Lett., 89, (12), Art. No. 125701, pp. 125701-1 thru 125701-4, (2002).
Kirby H.K. et al., "Poly(acrylic acid)—poly(ethylene oxide) comb polymer effects on BaTiO3 nanoparticle suspension stability", J. Am. Ceram. Soc., 87, (2), pp. 181-186, (2004).
Li,Q. et al., "Nanoparticle inks for directed assembly of three-dimensional periodic structures", Adv. Mater., 15, (19), pp. 1639-1643, (2003).
D.H. Napper, "Polymeric Stabilization of Colloidal Dispersions", Academic Press, pp. 28-30, (1983).
Zukoski C.F., "Material properties and the electrorheological response", Annu. Rev. Mater. Sci., 23, pp. 45-78, (1993).
Lewis, J.A. et al., "Direct Ink Writing of Three-Dimensional Ceramic Structures", J. Am. Ceram. Soc., 89 [12], pp. 3599-3609, (2006).

Mohraz, A. et al., "Structure and Dynamics of Biphasic Colloidal Mixtures", Phys. Rev. E, 77, Art No. 060403(R), pp. 060403-1 thru 060403-4, (2008).

Croucher, M. et al., "Selective Flocculation in Heterosterically Stabilised Nonaqueous Dispersions", Colloids and Surfaces, 1, pp. 349-360, (1980).

Rao, R. et al., Abstract of Biphasic Nanoparticle Inks for the Direct Writing of 3D Ceramic Structures, Department of Materials Science and Engineering, Univer. of Ill. at Urbana-Champaign, 1 page, (2006).

Whitby, C.P. et al., "PAA/PEO comb polymer effects on rheological properties and interparticle forces in aqueous silica suspensions", J. of Colloid and Interface Science, 262, pp. 274-281, (2003).

Lewis, J.A. et al., "Direct writing in three dimensions", Materials Today, pp. 32-39, (2004).

Duoss, E.B. et al., "Sol-Gel Inks for Direct-Write Assembly of Functional Oxides", Advanced Materials, 19, pp. 3485-3489, (2007).

Ryu, B-H. et al., "Synthesis of highly concentrated silver nanosol and its application to inkjet printing", Colloids and Surfaces A: Physicochem. Eng. Aspects, 270-71, pp. 345-351, (2005).

Xu, X. et al., "γ-Radiation synthesis of poly(acrylic acid)-metal nanocomposites", Materials Letters, 37, pp. 354-358, (1998).

Magdassi, S. et al., "Silver Nanoparticles as Pigments for Water-Based Ink-Jet Inks", Chem. Mater., 15, pp. 2208-2217, (2003).

Wang, W. et al., "Silver Nanoparticles Capped by Long-Chain Unsaturated Carboxylates", J. Phys. Chem. B, 103, pp. 7238-7246, (1999).

Jana, N.R. et al., "Single-Phase and Gram-Scale Routes toward Nearly Monodisperse Au and Other Noble Metal Nanocrystals", J. Am. Chem. Soc., 125, pp. 14280-14281, (2003).

Lin, X.Z. et al. "Direct Synthesis of Narrowly Dispersed Silver Nanoparticles Using a Single-Source Precursor", Langmuir, 19, pp. 10081-10085, (2003).

Wu, R-T. et al., "Preparation of highly concentrated and stable suspensions of silver nanoparticles by an organic base catalyzed reduction reaction", Materials Research Bulletin, 43, pp. 1276-1281, (2008).

Yamamoto, M. et al., "Size-Controlled Synthesis of Monodispersed Silver Nanoparticles Capped by Long-Chain Alkyl Carboxylates from Silver Carboxylate and Tertiary Amine", Langmuir, 22, pp. 8581-8586, (2006).

Fuller, S.B. et al., "Ink-Jet Printed Nanoparticle Microelectromechanical Systems", Journal of Microelectromechanical Systems, 11, pp. 54-60, (2002).

Kim, D. et al., "Direct writing of silver conductive patterns: Improvement of film morphology and conductance by controlling solvent compositions", Applied Physics Letters, 89, pp. 264101-1 thru 264101-3, (2006).

Perelaer, J. et al., "Ink-jet Printing and Microwave Sintering of Conductive Silver Tracks", Advanced Materials, 18, pp. 2101-2104, (2006).

Moon, K-S. et al., "Thermal Behavior of Silver Nanoparticles for Low-Temperature Interconnect Applications", J. Electronic Materials, 34, pp. 168-175, (2005).

Chou, K-S. et al., "Fabrication and sintering effect on the morphologies and conductivity of nano-Ag particle films by the spin coating method", Nanotechnology, 16, pp. 779-784, (2005).

Jones, J. et al., "Stretchable Wavy Metal Interconnects", J. Vacuum Sci. Technol. A, 22, pp. 1723-1725, (2004).

Khang, D-Y. et al., "A Streatchable Form of Single-Crystal Silicon for High Performance Electronics on Rubber Substrates", Science, 311, pp. 208-212, (2006).

Shiraishi, Y. et al., "Oxidation of ethylene catalyzed by colloidal dispersions of poly(sodium acrylate)-protected silver nanoclusters", Colloids and Surfaces A: Physicochemical and Engineering Aspects, 169, pp. 59-66, (2000).

Chapman, R. et al., "Electro-optical shifts in silver nanoparticle films", Chemical Physics Lett., 349, pp. 358-362, (2001).

Pastoniza-Santos, I. et al., "Formation and Stabilization of Silver Nanoparticles through Reduction by N,N-Dimethylformamide", Langmuir, 15, pp. 948-951, (1999).

Cliffel, D.E. et al., "Mercaptoammonium-Monolayer-Protected, Water-Soluble Gold, Silver, and Palladium Clusters", Langmuir, 16, pp. 9699-9702, (2000).

Kuo, P-L. et al., "Formation of Silver Nanoparticles under Structured Amino Groups in Pseudo-dendritic Poly(allylamine) Derivatives", J. Phys. Chem. B, 107, pp. 11267-11272, (2003).

Pal, T. et al., "Reversible Formation and Dissolution of Silver Nanoparticles in Aqueous Surfactant Media", Langmuir, 13, pp. 1481-1485, (1997).

Prasad, B.L.V. et al., "Solvent-Adaptable Silver Nanoparticles", Langmuir, 21, pp. 822-826, (2005).

Chang, J.S. et al., "Optimization of Nanosized Silver Particle Synthesis via Experimental Design", Ind. Eng. Chem. Res., 46, pp. 5591-5599, (2007).

Pyatenko, A. et al., "Synthesis of Spherical Silver Nanoparticles with Controllable Sizes in Aqueous Solutions", J. Phys. Chem. C, 111, pp. 7910-7917, (2007).

Slistan-Grijalva, A. et al., "Synthesis of silver nanoparticles in a polyvinylpyrrolidone (PVP) paste, and their optical properties in a film and in ethylene glycol", Materials Research Bulletin, 43, pp. 90-96, (2008).

Park, J-U. et al., "High-resolution electrohydrodynamic jet printing", Nature Materials, 6, pp. 782-789, (2007).

Gratson, G.M. et al., "Direct writing of three-dimensional webs", Nature, 428, p. 386, (2004).

Toshima, N. et al., "Effect of additional metal ions on catalyses of polymer-stabilized metal nanoclusters", J. of Molecular Catalysis A: Chemical, 177, pp. 139-147, (2001).

* cited by examiner

BIPHASIC INKS

CROSS REFERENCE TO RELATED APPLICATION

This application claims benefit of U.S. Provisional Application Ser. No. 61/106,440, filed Oct. 17, 2008, entitled "BIPHASIC INKS" which is incorporated by reference in its entirety.

FEDERALLY SPONSORED RESEARCH OR DEVELOPMENT

The subject matter of this application may have been funded in part under a research grant from the National Science Foundation (Grant Number DMR01-17792). The U.S. Government may have rights in this invention.

BACKGROUND

Almost any liquid that contains particles that are not fully solubilized can be characterized as a colloidal suspension. Colloidal suspensions enjoy widespread use in applications ranging from advanced materials to drug discovery. Colloid based products include paints, inks, coatings, ceramic precursors, cosmetics, and pharmaceutical compositions. In the case of ceramics, concentrated colloidal suspensions may be fabricated into dense components by sintering.

The viscosity of colloid suspensions can vary over a wide range from free-flowing liquid to flocculated gel. Dispersants that modify viscosity are often added to colloidal suspensions. A major benefit of viscosity control is the ability to lower the viscosity of a concentrated suspension. By lowering the viscosity, a suspension may be processed through pumps, pipes, and other machinery in a simpler and more cost effective manner. By tailoring interactions between colloidal particles through the addition of a dispersant, one can alter the viscosity of colloids to make them suitable for use in a broad array of applications. Through dispersant addition, colloidal suspensions may be processed at higher solids content than would otherwise be possible.

Poly(acrylic acid) (PAA) is the polyelectrolyte dispersant most widely used for the aqueous processing of ceramics. PAA contains carboxylic acid groups, one per monomer unit, along its backbone. By adding PAA, the dispersion of the colloidal particles is increased, thus reducing aggregation or flocculation. As flocculation is reduced, viscosity decreases. Another common dispersant used in ceramics processing is poly(methacrylic acid) (PMAA). PMAA contains carboxylic acid groups and methyl substituents on the backbone.

These polyelectrolyte dispersants are believed to reduce flocculation by stabilizing the colloid particles through the negative charge generated when the carboxylic acid functional groups are deprotonated. When deprotonated or ionized, the negatively charged carboxylic groups are believed to form an electrostatic repulsive barrier between the particles that form the colloid, thus reducing flocculation. It has also been postulated that the steric requirements of the dispersant provides additional stabilization.

PAA dispersant systems become less effective at reducing viscosity when higher ionic strength colloidal suspensions are involved, especially those containing multivalent ions. It is believed that the multivalent ions interfere with the electrostatic repulsive barrier of the carboxylic groups. This may result in a decreased electrostatic repulsive barrier between the colloidal particles, thereby increasing flocculation.

Hence, dispersants have been developed that can reduce flocculation of suspended particles and thus provide lowered viscosity in high ionic strength colloidal suspensions. In particular, Lewis et al. [55] teach suspensions stabilized by comb polymer dispersants and methods of using comb polymer dispersants to regulate the stability of colloidal suspensions having a high ionic strength, including suspensions containing multivalent ions.

Comb polymers, for example PAA/poly(ethylene oxide) (PEO) have nonionizable side-chains, in addition to ionizable side-chains. In relation to polymers having only ionizable side-chains such as PAA, comb polymers markedly reduce the viscosity of high ionic strength suspensions. By modifying the structure of the comb polymer, its concentration in the colloidal suspension, and the properties of the carrier liquid, the viscosity of the suspension may be altered by several orders of magnitude. The tendency of colloidal particles to flocculate is significantly reduced in relation to dispersants having only ionizable side-chains. The results are especially beneficial when the colloidal suspensions have high ionic strength arising from multivalent ions, and/or high concentrations of monovalent ions.

While not wishing to be bound by any particular theory, it is believed that the nonionizable side-chains of the comb polymers shield the ionized side-chains from ion bridging interactions (where an ion attracts dispersant coated particles), especially from multivalent ions. The nonionizable side-chains are also believed to impart steric stabilization over an interparticle separation distance that increases with the molecular weight of the nonionizable side-chains, thus making the suspension less sensitive to changes in ionic strength. In this manner, the comb polymers are believed to maintain repulsive forces between the suspended particles, even in the presence of the multivalent ions.

Suspensions stabilized by comb polymers may serve as colloid-based inks in techniques for fabricating three-dimensional structures, for example the robotic deposition technique disclosed in Cesarano et al. [54]. In such applications, the improved dispersion of nanoparticles that is yielded by comb polymers has proven to be advantageous [52, 55]. Importantly, the above inks enable the production of three-dimensional structures with feature sizes as small as 100 microns [53]. However, current direct-write techniques, which use colloid-based inks are difficult to apply to length scales finer than 100 microns, due to problems with clogging and other flow instabilities such as filter pressing.

SUMMARY

In a first aspect, the invention is a biphasic ink, comprising a plurality of attractive particles, a plurality of repulsive particles, and a carrier liquid.

In a second aspect, the invention is a method for making a biphasic ink, comprising forming attractive particles by mixing first particles, a first carrier liquid and an attractive dispersant; forming repulsive particles by mixing second particles, a second carrier liquid and a repulsive dispersant; and mixing the attractive particles and the repulsive particles, to form the biphasic ink.

DEFINITIONS

The term "polymer" is defined as a molecule including a plurality of monomer units. Monomer units are the individual moieties that are repeated to form polymers. Multiple monomer units are covalently attached forming the backbone of a polymer. Polymers that are made from at least two different monomer units are referred to as copolymers. Polymerizing or copolymerizing describes the process by which multiple monomers (i.e. chemical compounds) are reacted to form covalently linked monomer units that form polymers or copolymers, respectively. A discussion of polymers, monomer units, and the monomers from which they are made may be found in Stevens [56].

DETAILED DESCRIPTION

Figure 1:
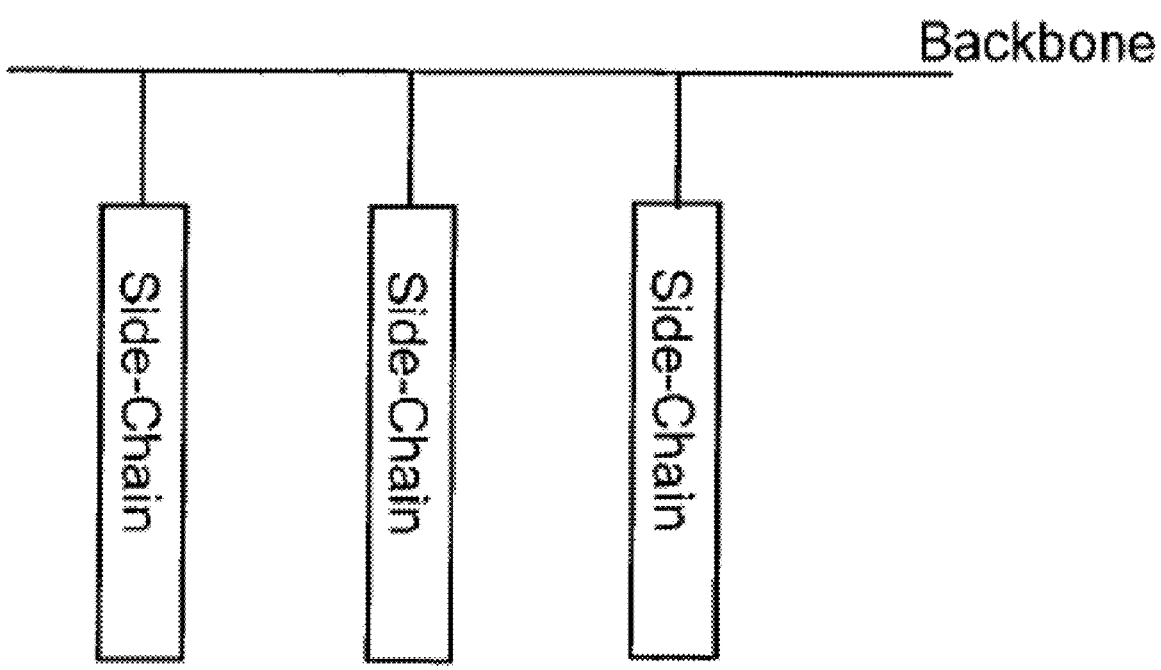
FIG. 1 is an illustrative example of a comb polymer.

The present invention is based on the discovery of colloid-based biphasic inks. Such inks contain both attractive particles and repulsive particles, in a carrier liquid. The attractive colloidal particles attract one another, thus forming a gel phase. Conversely, repulsive colloidal particles do not attract each other, thereby remaining fluid. The inclusion of both types of colloidal particles yields biphasic inks that have been demonstrated to produce structures with feature sizes as small as 10 microns, and can produce structures with feature sizes as small as 1 micron, since they may be printed through a nozzle with a orifice having a diameter of 1 micron. Accordingly, the biphasic inks can be used to produce three-dimensional patterned structures with feature sizes smaller than 50 microns, thus reducing the length scale of printing from that achievable with traditional colloid inks. While not wishing to be bound by any particular theory, it is believed that these improved properties are due to the presence of the repulsive particles, which increase the colloid volume fraction but do not participate in the formation of a gel.

Biphasic inks contain both attractive particles and repulsive particles, in a carrier liquid. Biphasic inks can be obtained by a combination of attractive colloidal particles and repulsive colloidal particles, in a carrier liquid. Three representative types of biphasic inks are described below: hydrophobic colloids/hydrophilic colloids biphasic inks; isoelectric point biphasic inks; and biphasic inks with attractive and repulsive dispersants.

Hydrophobic Colloids/Hydrophilic Colloids Biphasic Inks

In a first representative type of biphasic inks, the attractive particles are hydrophobic colloids, the repulsive particles are hydrophilic colloids and the carrier liquid is hydrophobic. More generically, depending on the choice of carrier liquid, a first colloid with a high interfacial energy with the carrier liquid will yield attractive particles, whereas a second colloid with a low interfacial energy with the carrier liquid will give rise to repulsive particles. Thus, mixing the two colloids and the carrier liquid will yield a biphasic ink. If desired, a carrier liquid whose hydrophobicity is dependent on the temperature or other variables may be chosen. The relative hydrophobicity of the particles may also vary with the temperature or other variables.

One way of attaining hydrophobic colloids/hydrophilic colloids biphasic inks is starting from a hydrophilic colloid, for instance colloidal silica, or another oxide ceramic, and functionalizing its surface by attaching hydrophobic moieties such as trialkylsilyl groups. The resulting functionalized silica particles will thus serve as hydrophilic colloid, whereas non-functionalized silica will provide the hydrophobic colloid.

Isoelectric Point Biphasic Inks

In a second representative type of biphasic inks, the attractive and repulsive particle may be created by using a first set of particles and a second set of particles differing in isoelectric point (IEP). When the composition is at the IEP of the first set of particles, the first set will tend to attract one another. At the same time, the second set will be highly charged and repulsive. Accordingly, a combination of the first set and the second set of particles will provide a biphasic ink. For example, a combination of any two of the following colloids, at a pH where one of the types of particles is at its isoelectric point, could be used: alumina, silica, titania, zirconia, halfnia, as well as other metal oxides.

Biphasic Inks from Attractive Colloidal Particles and Repulsive Colloidal Particles Prepared With Attractive Dispersants and Repulsive Dispersants In a third representative type of biphasic inks, the attractive colloidal particles are obtained from colloidal solutions that tend to be more viscous and prone to flocculation and gelling when at high ionic strength, in the presence of multivalent ions and/or when a flocculant is added. Such solutions can be made by combining a powder with attractive dispersants, where an attractive dispersant tends to yield gels at high ionic strengths and in the presence of flocculants or multivalent ions. Conversely, the repulsive colloidal particles of the biphasic ink are colloidal particles that exhibit reduced viscosity and flocculation at high ionic strengths and remain fluid in the presence of a flocculant. Such repulsive particles can be made by combining a powder with repulsive dispersants, which is dispersants that have been found to maintain repulsive forces between the suspended particles of a colloid, even in the presence of multivalent ions and/or flocculants.

Attractive colloidal particles are obtained by combining particles with an attractive dispersant, for example a polyelectrolyte that yields flocculation and/or gelling at low ionic strengths and/or in the presence of a flocculant. One preferred class of polyelectrolyte is a polymer where each monomer unit of the polymer includes an ionizable side-chain. When the ionizable side-chains ionize anionically, for example a carboxylic acid, a sulfonic acid, or a phosphonic acid, the polymer is also known as a "anionic polyelectrolyte".

Examples of useful anionic polyelectrolytes include polymers containing carboxylic acid side-chains, such as poly (acrylic acid), poly(methacrylic acid), poly(methyl methacrylate), poly(lauryl methacrylate), salts of carboxymethyl ether, carboxyl terminated poly(butadiene/acrylonitrile), poly(butadiene/maleic acid), poly(butyl acrylate/acrylic acid), poly(ethylene glycol)monocarboxymethyl ether monomethyl ether, poly(ethylene/maleic acid), poly(maleic acid), poly(methyl methacrylate/methacrylic acid), poly(vinyl methyl ether/maleic acid), poly(vinyl methyl ether/monobutyl maleate), poly(vinyl methyl ether/monoethyl maleate), poly(vinyl methyl ether/mono-iso-propyl maleate).

Example anionic polyelectrolytes that are functionalized with sulfonic acid side-chains include poly(vinylsulfonic acid), poly(styrenesulfonic acid), and poly(1,6)alpha-d-glucose sulfate. Example polymers functionalized with phosphonic acid groups include poly(vinylphosphoric acid) and poly(styrenephosphoric acid). Siloxanes such as poly(dimethylsiloxane) may also be used.

More preferable anionic polyelectrolytes include sulfonated naphthalene formaldehyde, sulfonated melamine formaldehyde, poly(vinyl phosphonic acid), poly(acrylic acid), poly(methacrylic acid), poly(vinylsulfonic acid), poly(vinylphosphoric acid), poly(styrene sulfonic acid), and poly(maleic acid). Especially preferable anionic polyelectrolytes include sulfonated naphthalene formaldehyde, sulfonated melamine formaldehyde, and poly(vinyl phosphonic acid.

Polymers known as "cationic polyelectrolytes" are polymers where each monomer unit of a polymer contains an ionizable side-chain that ionizes cationically. Cationic polyelectrolytes are another class of preferred attractive dispersant. Examples of useful cationic polyelectrolytes include polymers containing amine moieties, such as polyethyleneimine, poly(d-glucosamine), poly(acrylamide/2-methacryloxyethyltrimethylammonium bromide 80:20), poly(allylamine hydrochloride), poly(4-aminostyrene), poly(3-chloro-2-hydroxypropyl-2-methacroxyethyldimethylammonium chloride), poly(diallyldimethylammonium chloride), poly(2-dimethylaminoethyl methacrylate), polyethylenimine, poly(2-hydroxy-3-methacryloxypropyltrimethyl-ammonium chloride), poly(2-methacryloxyethyltrimethylammonium bromide), poly(N-methylvinylamine), poly(tetramethylene oxide)bis-4-aminobenzoate, poly(vinylamine)hydrochloride, poly(4-vinylbenzyltrimethylammonium chloride), poly(2-vinyl-1 methylpyridinium bromide), poly(4-vinyl-1 methylpyridinium bromide), poly(2-vinylpyridine), poly(4-vinylpyridine), poly(2-vinylpyridine N-oxide), poly(4-vinylpyridine N-oxide), and poly(N -vinylpyrrolidone/2-dimethylaminoethyl methacrylate)dimethyl sulfate quaternary, and mixtures thereof.

More preferable cationic polyelectrolytes include poly(2-vinylpyridine N-oxide), poly(4-vinylpyridine N-oxide), poly(4-aminostyrene), poly(ethylene imine), poly (4-vinylpyridine), poly(2-vinylpyridine), poly(N-methylvinylamine), poly(d-glucosamine), and poly(vinyl imine)hydrochloride, or mixtures thereof. Especially preferable cationic polyelectrolytes are selected from the group consisting of poly(2-vinylpyridine N-oxide), poly(4-vinylpyridine N-oxide), and poly(4-aminostyrene).

Bio-compatible polymers can also be used, for example carboxyl terminated poly(azelaic anhydride), polycaprolactone, polycaprolactone diol, poly(glycolic acid), poly(dl-lactic acid), poly(l-lactic acid), poly(dl-lactide/glycolide), and poly(l-lactide/glycolide).

More preferable bio-compatible polymers include polyamines, polyamides, polyesteramides, poly(lactic acid), poly(glycolic acid), nucleic acids (DNA and RNA), proteins, polysaccharides, and poly(caprolactone). Especially preferable bio-compatible polymers are polyamines, polyamides, polyesteramides, and mixtures thereof.

Repulsive colloids suspensions are suspensions comprising repulsive colloidal particles. Such suspensions tend not to increase in viscosity and are less prone to flocculation when at high ionic strength and/or when a flocculant is added. One way to obtain such suspensions is by using repulsive dispersants, such as comb polymers [55]. A discussion of comb polymers and their various structures may be found in Napper [57]. An illustrative example of a comb polymer is depicted in FIG. 1.

Preferred comb polymers contain at least two types of side-chains and are water-soluble. By water-soluble it is meant that at least one gram of the polymer may be dissolved in one liter of water. Preferably, the first type of side-chain, referred to as ionizable, has moieties that ionize at the pH of the colloidal suspension. These moieties can ionize to either anionic or cationic states when they dissociate in the carrier liquid. If desired, comb polymers that form both cationic and anionic moieties upon dissociation may be combined to alter the stability of the colloidal suspension. Preferably, the second type of side-chain, referred to as nonionizable, does not ionize at the pH of the colloidal suspension.

Figure 2:
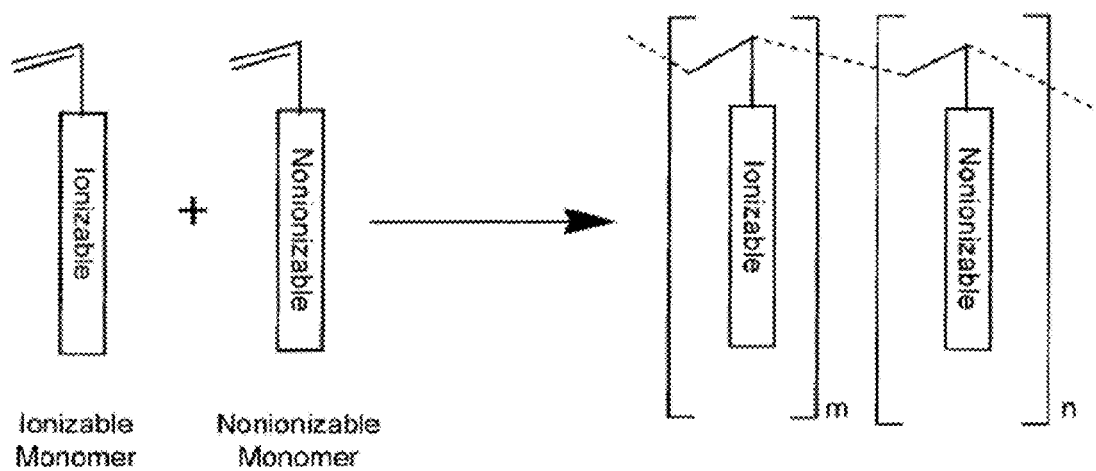
FIG. 2 is an illustrative example of a first synthesis pathway for manufacturing a comb polymer.

Although many variations to synthesize comb polymers are known, there are two basic pathways. The first is to form a copolymer from a monomer or monomer unit having ionizable side-chains and a monomer or monomer unit having nonionizable side-chains. An illustrative example of this synthesis pathway is shown in FIG. 2.

By varying the ratio m:n of ionizable (m) to nonionizable (n) monomers combined to form the polymer, usually in the range from 20:1 to 1:1, the resulting comb polymer may be tuned to stabilize a specific colloidal suspension, or group of suspensions. By maintaining a sufficient number of ionizable side-chains, in relation to nonionizable side-chains, the water solubility of the comb polymer may be maintained.

Figure 3:
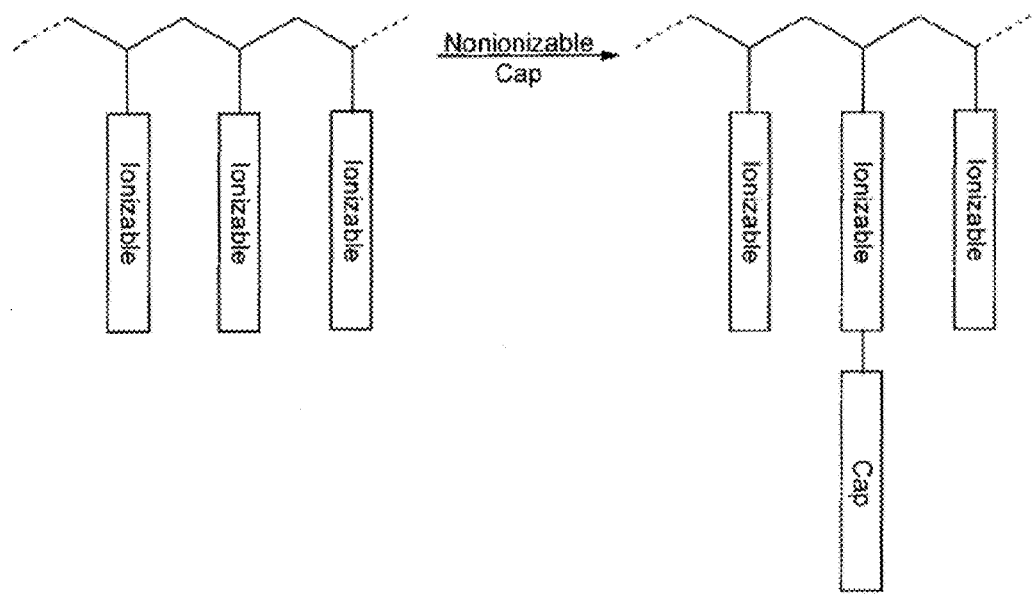
FIG. 3 is an illustrative example of a second synthesis pathway for manufacturing a comb polymer.

The second comb polymer synthesis method begins with a polymer having ionizable groups on the backbone that can be functionalized with nonionizable groups (cap). By capping a portion of the polymer's ionizable groups with nonionizable groups, a comb polymer having both ionizable and nonionizable side-chains may be formed. An illustrative example of this synthesis pathway is shown in FIG. 3.

By controlling the reaction of the capping agent with the polymer, the number of ionizable side-chains that are converted to capped nonionizable side-chains may be varied. Thus, the resultant comb polymer may be tuned to stabilize a specific colloidal suspension, or type of suspensions. As above, water-solubility can be maintained by limiting the degree of capping of the hydrophilic backbone.

While any comb polymer may be used which provides the desired stability to the suspension, preferred comb polymers are obtained by capping a portion of the ionizable groups of the polymers listed above in the description of the attractive colloidal suspensions.

Examples of useful capping agents for forming the neutral side-chains include polyethylene oxide, poly(ethylene glycol), poly(ethylene glycol)dimethyl ether, poly(ethylene glycol)monomethyl ether, polypropylene oxide, poly(propylene glycol), poly(methyl methacrylate), poly(vinyl alcohol), poly(vinyl pyrrolidone), poly(vinyl acetate), polyacrylamide, poly(oxyethylene), poly(vinyl methyl ether), and poly(dimethylsiloxane), and mixtures thereof. Suitable capping agents may be obtained from multiple chemical suppliers, including Polysciences, Inc. (Warrington, Pa.) and Sigma-Aldrich (St. Louis, Mo.).

More preferable capping agents include poly(vinyl alcohol), poly(vinyl acetate), poly(dimethylsiloxane), poly(ethylene oxide), poly(ethylene glycol), poly(propylene oxide), polyacrylamide, poly(vinyl pyrrolidone), and poly(oxyethylene), or mixtures thereof. Especially preferable capping agents include poly(vinyl alcohol), poly(vinyl acetate), and poly(dimethylsiloxane), or mixtures thereof.

Especially preferred are comb polymers made from the reaction of a hydrophilic polyacrylic acid backbone with polyethylene oxide caps that results in a comb polymer having ionizable side-chains incorporating a carboxylic acid moiety and nonionizable side-chains incorporating a polyethylene oxide moiety. For example, polyacrylic acid can be capped with polyethylene oxide. By varying m, n, and/or o the molecular weight of the comb polymer and the ratio of ionizable versus nonionizable side-chains may be altered. By varying p, the molecular weight of the cap may be altered. As used in this specification and appended claims, the term "a comb polymer" includes one or more polymeric units and one or more types of polymeric units.

In addition to changing the atomic structure of the backbone and side-chains, and the ratio between ionizable and nonionizable side-chains (m versus n), the molecular weight of the backbone (determined by o) and side-chains (determined by p) may be varied to control suspension stability. Preferable ratios of ionizable to nonionizable side-chains (m versus n) are from 20:1 to 1:1 and more preferably from 10:1 to 2:1. Preferable average molecular weights (grams/mole) of the comb polymer backbone (o) are from 1,000 to 15,000 and more preferably from 2,000 to 10,000. When polyacrylic acid backbones are used, preferable values for p result in polyethylene oxide caps having average molecular weights (grams/mole) from 100 to 5,000, more preferably from 600 to 3,000, and most preferably from 900 to 2,200.

Additional information on comb polymers is described in Lewis et al., U.S. Pat. No. 7,053,125.

Ionic Strength of Colloidal Suspension

In general, two sets of circumstances result in a colloidal suspension being of low or high ionic strength [55]. The first are colloidal suspensions that contain monovalent ions solvated in the carrier liquid. Monovalent ions are those that attain a $+1$ or $-1$ ionization state when ionized in the carrier liquid. High concentration is defined as a molarity of 0.1 or greater for monovalent ions. In certain cases, depending on the composition of the suspension, high concentration is preferably a molarity of 0.5 or greater, more preferably 1.0 or greater.

A second circumstance resulting in low or high ionic strength involves colloidal suspensions that contain multivalent ions. High concentration is defined as a molarity of 0.001 or greater in the carrier liquid for multivalent ions. In certain cases, depending on the composition of the suspension, high concentration is preferably a molarity of 0.01 or greater, more preferably 0.1 or greater. Multivalent ions are those that attain a $+2$ or higher, or a $-2$ or lower, ionization state when ionized in the carrier liquid. Examples include metal ions, organic salts, low molecular weight PEI, and EDTA.

The ionization state of an ion is determined by the charge it adopts in the carrier liquid. Depending on the atomic make-up of the ion, ions may be present in the $+1$, $-1$, $+2$, $-2$ or higher and lower ionization states ($+3$ or $+4$, for example). The molarity of ions solvated in a colloidal suspension is determined by analyzing a sample of the carrier liquid, which contains the ions, for instance by Inductively Coupled Plasma (ICP) analysis. The carrier liquid may be initially separated from the suspended particles, by for example, centrifugation. By this method, the quantity and atomic identity of the solvated ions is determined. Thus, the molarity of ions in the carrier liquid may be determined and their oxidation states may be implied from their identities.

High ionic strength colloidal suspensions may be initially created, for example by the addition of electrolytes that dissociate to form ions in the carrier liquid, or may form over time through dissolution of the suspended particles of an initially lower ionic strength suspension. One way that the ionic strength of a suspension increases over time is when some of the suspended colloidal particles, or the ions on their surfaces, are solvated into the carrier liquid. This increased solvation over time, or "dissolution" can increase the ionic strength of a colloidal suspension by increasing the solvated ion concentration in the suspension.

Carrier Liquid

The properties of colloidal suspensions, for instance their viscosity, may also be controlled by means of the polarity of the carrier liquid in which the particles are suspended. Colloidal dispersions contain particles that are not solubilized; instead, the particles are suspended in a carrier liquid. Depending on the particles and dispersants used, varying degrees of carrier liquid polarity may be used to further tune suspension viscosity.

While many carrier liquids may be used to form an attractive dispersant/repulsive dispersant biphasic colloidal ink, water is especially preferred. Other preferred carrier liquids include alcohols, such as methanol, propanol, ethanol, and t-butanol, N,N-dimethylformamide (DMF), dimethyl sulfoxide (DMSO), acetone, acetonitrile, acetic acid, hexamethylphosphoric triamide (HMPA), tetrahydrofuran (THF), N,N-dimethylacetamide, N-methyl-2-pyrrolidone, tetramethyl urea, glycerol, ethylene glycol, and mixtures thereof, and mixtures thereof with water.

Particles

The particles are suspended or dispersed in a carrier liquid to form a colloidal suspension. Preferable particles include metals, ceramics, ceramic precursors, semiconductors, polymers, biodegradable polymers, bioactive agents, proteins, liposomes, other biomolecules, and mixtures thereof.

Examples of preferred metal particles for use in colloidal suspensions include elemental metal particles; such as iron, tin, zinc, aluminum, beryllium, niobium, copper, tungsten, silver, gold, molybdenum, platinum, cobalt, nickel, manganese, cerium, silicon, titanium, tantalum, and magnesium; mixtures, and alloys of the above metals; metal alloys such as steels and tool steels, stainless steels, plain carbon steels, low carbon steels, aluminum-nickel, brass, bronze; and alloys used for biomedical applications such as cobalt-chromium, cobalt-chromium-molybdenum, cobalt-chromium-tungsten-nickel, cobalt-nickel-chromium-molybdenum-titanium, titanium-aluminum-vanadium alloys, and mixtures and alloys thereof.

More preferable metal particles include steels, molybdenum, nickel, gold, silver, platinum, titanium-aluminum-vanadium alloys, tungsten, and aluminum, and mixtures and alloys thereof. Especially preferable metal particles include tool steels, molybdenum, and nickel.

Ceramics and ceramic precursor particles are those that can form ceramic substrates or materials when heated or sintered. Examples of ceramic precursors include oxides, such as alumina, silica, zirconia, magnesium oxide, zinc oxide, tin oxide, titanium oxide, indium oxide, lanthanum oxide, yttrium oxide, calcium oxide, silver oxide, and iron oxide; clays and whitewares, such as kaolinite, bentonite, and feldspars; carbides, such as silicon carbide, boron carbide, and tungsten carbide; nitrides such as silicon nitride, aluminum nitride, and boron nitride; titanates, such as barium titanate, lead zirconate titanate, and lead zirconate strontium titanate; ferrites, such as zinc ferrite, manganese ferrite, iron ferrite, cobalt ferrite, nickel ferrite, copper ferrite, magnesium ferrite; manganites, such as manganese manganite and magnesium manganite; hydroxyapatite; calcium phosphate-based ceramics; diamond; carbon black; as well as combinations, mixtures, and solid solutions thereof.

More preferable ceramics and ceramic precursors include hydroxyapatite, titanium oxide, lead zirconate, titanate, alumina, silica, zirconia, silicon nitride, barium titanate, and silicon carbide, and mixtures thereof. Especially preferable ceramics and ceramic precursors are hydroxyapatite, titanium oxide, barium titanate, and lead zirconate titanate, and mixtures thereof.

Preferable semiconductor particles are those that can form semiconducting materials when heated sintered. Examples of semiconductor particles include silicon; III-V semiconducting materials including gallium arsenide, gallium nitride, gallium phosphide, gallium antimide, aluminum antimide, indium arsenide, indium phosphide, and indium antimide; II-VI semiconducting materials including zinc oxide, cadmium sulfide, cadmium telluride, zinc sulfide, cadmium selenide, zinc selenide, and IV-VI semiconducting materials including lead sulfide, lead telluride, and mixtures thereof.

More preferable semiconductor particles are gallium arsenide, indium arsenide, indium phosphide, silicon, cadmium sulfide, zinc sulfide, cadmium telluride, cadmium selenide, zinc selenide, and mixtures thereof. Especially preferable semiconductor particles include gallium arsenide, indium arsenide, indium phosphide, and mixtures thereof.

Preferable polymer particles include polystyrene, polyorganosiloxane, poly(methyl methacrylate), polystyrene, polylactic acids, acrylic latexes, polyorganosiloxane, cellulose, polyethylene, poly(vinyl chloride), poly(ethyl methacrylate), poly(tetrafluoroethylene), poly(4-iodostyrene/divinylbenzene), poly(4-vinylpyridine/divinylbenzene), poly(styrene/divinyl benzene), crosslinked melamine particles, phenolic polymer colloids, polyamide 6/6, natural rubber, collagen, and mixtures thereof.

More preferable polymer particles include acrylic latexes, poly(ethyl methacrylate), cellulose polystyrene, poly(methyl methacrylate), poly(lactic acids), natural rubber, polyethylene, and poly(vinyl chloride). Especially preferable polymer particles include acrylic latexes, poly(ethyl methacrylate), cellulose, and mixtures thereof.

Preferable particles may also be bioactive agents. Bioactive agents, which may be delivered by colloidal suspensions, include drugs that act on the peripheral nerves, adrenergic receptors, cholinergic receptors, the skeletal muscles, the cardiovascular system, smooth muscles, the blood circulatory system, synoptic sites, neuroeffector junction sites, endocrine and hormone systems, the immunological system, the reproductive system, the skeletal system, autacoid systems, the alimentary and excretory systems, the histamine system, and the central nervous system. Suitable agents may be selected from, for example, proteins, enzymes, hormones, polynucleotides, nucleoproteins, polysaccharides, glycoproteins, lipoproteins, polypeptides, steroids, analgesics, local anesthetics, antibiotic agents, anti-inflammatory corticosteroids, ocular drugs and synthetic analogs of these species.

Examples of drugs which may be delivered by colloidal suspensions include prochlorperzine edisylate, ferrous sulfate, aminocaproic acid, mecamylamine hydrochloride, procainamide hydrochloride, amphetamine sulfate, methamphetamine hydrochloride, benzamphetamine hydrochloride, isoproterenol sulfate, phenmetrazine hydrochloride, bethanechol chloride, methacholine chloride, pilocarpine hydrochloride, atropine sulfate, scopolamine bromide, isopropamide iodide, tridihexethyl chloride, phenformin hydrochloride, methylphenidate hydrochloride, theophylline cholinate, cephalexin hydrochloride, diphenidol, meclizine hydrochloride, prochlorperazine maleate, phenoxybenzamine, thiethylperzine maleate, anisindone, diphenadione erythrityl tetranitrate, digoxin, isoflurophate, acetazolamide, methazolamide, bendroflumethiazide, chloropromaide, tolazamide, chlormadinone acetate, phenaglycodol, allopurinol, aluminum aspirin, methotrexate, acetyl sulfisoxazole, erythromycin, hydrocortisone, hydrocorticosterone acetate, cortisone acetate, dexamethasone and its derivatives such as betamethasone, triamcinolone, methyltestosterone, 17-S-estradiol, ethinyl estradiol, ethinyl estradiol 3-methyl ether, prednisolone, 17-hydroxyprogesterone acetate, 19-norprogesterone, norgestrel, norethindrone, norethisterone, norethiederone, progesterone, norgesterone, norethynodrel, aspirin, indomethacin, naproxen, fenoprofen, sulindac, indoprofen, nitroglycerin, isosorbide dinitrate, propranolol, timolol, atenolol, alprenolol, cimetidine, clonidine, imipramine, levodopa, chlorpromazine, methyldopa, dihydroxyphenylalanine, theophylline, calcium gluconate, ketoprofen, ibuprofen, cephalexin, erythromycin, haloperidol, zomepirac, ferrous lactate, vincamine, diazepam, phenoxybenzamine, diltiazem, milrinone, mandol, quanbenz, hydrochlorothiazide, ranitidine, flurbiprofen, fenufen, fluprofen, tolmetin, alclofenac, mefenamic, flufenamic, difuinal, nimodipine, nitrendipine, nisoldipine, nicardipine, felodipine, lidoflazine, tiapamil, gallopamil, amlodipine, mioflazine, lisinolpril, enalapril, enalaprilat captopril, ramipril, famotidine, nizatidine, sucralfate, etintidine, tetratolol, minoxidil, chlordiazepoxide, diazepam, amitriptyline, imipramine, and mixtures thereof.

Further examples are proteins and peptides which include bone morphogenic proteins, insulin, colchicine, glucagon, thyroid stimulating hormone, parathyroid and pituitary hormones, calcitonin, renin, prolactin, corticotrophin, thyrotropic hormone, follicle stimulating hormone, chorionic gonadotropin, gonadotropin releasing hormone, bovine somatotropin, porcine somatotropin, oxytocin, vasopressin, GRF, somatostatin, lypressin, pancreozymin, luteinizing hormone, LHRH, LHRH agonists and antagonists, leuprolide, interferons such as interferon alpha-2a, interferon alpha-2b, and consensus interferon, interleukins, growth hormones such as human growth hormone and its derivatives such as methione-human growth hormone and des-phenylalanine human growth hormone, bovine growth hormone and porcine growth hormone, fertility inhibitors such as the prostaglandins, fertility promoters, growth factors such as insulin-like growth factor, coagulation factors, human pancreas hormone releasing factor, analogs and derivatives of these compounds, and pharmaceutically acceptable salts of these compounds, or their analogs or derivatives.

Other bioactive agents, which may be delivered by colloidal suspensions, include chemotherapeutic agents, such as carboplatin, cisplatin, paclitaxel, BCNU, vincristine, camptothecin, etoposide, cytokines, ribozymes, interferons, oligonucleotides and oligonucleotide sequences that inhibit translation or transcription of tumor genes, functional derivatives of the foregoing, and generally known chemotherapeutic agents such as those described in Brem et al. [58].

Not only can many of these bioactive agents, including proteins, directly serve as the particles in a colloidal suspension, but they can also be mixed with biodegradable compositions or polymers to form particles. By grinding a mixture containing one or more biodegradable composition and bioactive agent into particles, colloidal suspensions may be formed. Many useful biodegradable compositions suitable for use with bioactive agents may be found in Igari et al. [59].

Examples of useful biodegradable polymers for use in particle formation include polyesters, such as poly(caprolactone), poly(glycolic acid), poly(lactic acid), and poly(hydroxybutryate); polyanhydrides, such as poly(adipic anhydride) and poly(maleic anhydride); polydioxanone; polyamines; polyamides; polyurethanes; polyesteramides; polyorthoesters; polyacetals; polyketals; polycarbonates; polyorthocarbonates; polyphosphazenes; poly(malic acid); poly(amino acids); polyvinylpyrrolidone; poly(methyl vinyl ether); poly(alkylene oxalate); poly(alkylene succinate); polyhydroxycellulose; chitin; chitosan; and copolymers and mixtures thereof. Examples of methods for forming particles from mixtures containing bioactive agents and biodegradable polymers are described in Machida et al. [60].

More preferred bioactive agents are drugs, proteins, enzymes, polynucleotides, lipoproteins, liposomes, polypeptides, chemotherapeutic agents, hormones, polysaccharides, steroids, analgesics, local anesthetics, antibiotic agents, anti-inflammatory corticosteroids, and mixtures thereof. Of course, calcium silicate hydrates, cement, cement precursors, calcium sulfate hemihydrates, gypsum, and gypsum precursors are not suitable bioactive agents.

Depending on their surface structure and the nature of the carrier liquid, the average effective diameter of a set of particles suitable for colloid formation can vary over a wide range. By "average effective diameter" it is meant the average of the longest dimension of each particle of the set. Thus, if a particle is 0.01 microns in one dimension and 10 microns in another, the effective diameter of the particle is 10 microns.

Preferred particles have average effective diameters of 1 nanometer to 100 microns, more preferably 10 nanometers to 50 microns, and most preferably 20 nanometers to 3 microns. Preferably, the particles are not soluble in the carrier liquid (i.e. one gram of the particles does not completely dissolve in one liter of the carrier liquid).

Preparation of Biphasic Inks

The two suspensions are combined at a desired ratio, yielding a mixed suspension that contains both attractive and repulsive particles. Preferably, the attractive particles and the repulsive particles are combined in a ratio $W_a:W_r$ that is equal to at most 10:1 and at least 1:10, where $W_a$ is the weight of the attractive particles and $W_r$ is the weight of the repulsive particles. More preferably, the ratio $W_a:W_r$ is at most 5:1 and at least 1:5. Most preferably, the ratio $W_a:W_r$ is at most 2.5:1 and at least 1:2.5.

Flocculation of the mixed suspension optionally follows, for example by addition of a flocculant, preferably until a suspension concentration that is between 0.1 M and 0.01 M is reached. Examples of flocculants include multivalent salts, which are salts which dissociate in the carrier liquid to produce multivalent ions. Cationic polyelectrolytes and anionic polyelectrolytes can also serve as flocculants, when added to an existing suspension. Example cationic polyelectrolytes include polyethyleneimine (PEI), polylysine, (poly[[2(propionyloxy)ethyl]trimethylammoniumchloride] (PCMA), poly(3-ethacrylamidopropyl)trimethylammonium chloride (MAP-TAC), poly(2-acryloxyethyl)-trimethylammonium chloride (CMA), polyallylamine hydrochloride (PAH), polydialyldimethylammonium chloride (PDADMAC or PDDA), poly(styrene-co -dimethylaminopropylmaleimide) (PS-DAM), poly(2-vinyl-N-methylpyridinium iodide) (PVP+), cationic polyacrylamide (CPAM), maleimide propyl trimethylammonum chloride (MPTMAC), and poly[[2-(meth-acryloyloxy)ethyl]trimethylammonium iodide] (PMETEI). Example anionic electrolytes include poly(acrylic acid) (PAA), poly(methacrylic acid) (PMAA), poly(2-acrylamido-2-methyl-1-propanesulfonic acid), poly(sodium 4-styrenesulfonate), poly(4-styrenesulfonic acid), poly(vinylsulfonic acid), poly(anetholesulfonic acid), poly(styrene-alt-maleic acid), polyacrylamide sulfonate, melamine formaldehyde sulfonate (MFS), sodium carboxymethylcellulose, and dextran sulfate poly(maleic anhydride).

If desired, the viscosity of the ink may be increased by the addition of viscosity modifiers such as methylcellulose, hydroxypropyl methylcellulose, hydroxyethyl methylcellulose, guar gum, poly(ethylene oxide), xanthan gum, alginate, starch, polyvinyl alcohol (PVA), polyethylene glycol (PEG), and carrageenan.

To maximize printability, biphasic colloidal inks that possess a high ratio of compressive yield stress, $P_y(\phi)$, to shear yield stre, $\tau_y(\phi)$ are desired. These inks flow more easily through fine deposition nozzles.

Deposition of the Inks

As the inks flow through a fine deposition nozzle, they allow for micron size control of molding and extrusion to produce solid structures. Preferably, the nozzle has a diameter of at most 1000 micron, more preferably at most 100 microns, most preferably at most 50 microns. For example, the nozzle diameter may be 1 to 100 microns, such as 10-50 microns, allowing for the formation of filament widths of 1 to 100 microns, including 10-50 microns. Such structures may be manufactured according to micron-scale fabrication methods described in U.S. Pat. No. 7,141,617. They may be printed directly in air, or more preferably printed into a non-wetting oil reservoir. An applied pressure forces an ink through a deposition nozzle that is attached to a moving x-y-z micropositioner onto a substrate. The nozzle then incrementally rises in the z (vertical) direction for the next layer of the pattern. This process is repeated until the desired three-dimensional structure has been created. When structures are printed in a reservoir, the excess fluid can be removed after printing is complete and then drying can commence. With this technique, any three-dimensional structure can be defined and fabricated. Some examples of structures are those shown in FIGS. 7, 8, 9 and 10. Other examples include ceramic membranes having very controlled pore sizes, such as ceramic membranes with pore sizes ranging from 1-2000 microns, including 10-50 microns, 1-100 microns and 20-250 microns.

After the one-dimensional, two-dimensional and three-dimensional structure is formed from the activated ink, the structure may be thermally annealed to facilitate conversion to the desired phase. For example, the substrate with the structure may placed in a programmable oven and heated in an oxidizing atmosphere, for instance air or pure oxygen, until organic burnout and crystallization are complete.

The inks may be used in several settings, for instance in the production of rapid-setting protective films, as well as the extrusion or molding from the nano to the macro scale, such as in the rapid manufacture of prototypes. The structures are useful for many applications including photonic crystals, photonic band gap materials, sensors, membranes, transparent conductors, ferroelectric devices, catalyst supports and oxide conductors.

Further information on the deposition of inks in the formation of three dimensional structures can be found in Lewis et al. [62].

EXAMPLES

Example 1

Preparation of Attractive Dispersant/Repulsive Dispersant Biphasic Inks

A first concentrated barium titanate (typically of molecular formula BaTiO3, BT-16 K-plus, Cabot Co., Boyertown, Pa.)

suspension was prepared by adding barium titanate powder to an appropriate amount of PAA/PEO comb polymer (approximate molecular weight: 2000 grams/mole, Adva Flow, W.R. Grace Construction Co., Cambridge, Mass.) to create a 10 v % (volume percent) suspension. This suspension was stirred for at least 24 hours, with periodic sonications (with the sonicator 1 second off and 1 second on for a total of 10 minutes) every 12 hours. The suspension was then filtered through a 20 micron nylon mesh, stirred for 24 hours, and centrifuged at 3500 rpm for 45 minutes to obtain a concentrated, stable suspension of PAA/PEO-coated repulsive particles.

A second concentrated barium titanate suspension was prepared according to the same procedure as set forth above for the first concentrated barium titanate suspension, this time with PAA (approximate molecular weight: 5000 grams/mole, Polysciences Inc., Warrington, Pa.) as the dispersant. A stable suspension of PAA-coated attractive particles was obtained.

To create biphasic inks, the PAA- and PAA/PEO-coated particles were combined in a ratio of 2:1. The resulting suspension was then flocculated with polyethyleneimine (PEI, approximate molecular weight 600 grams/mole, Polysciences Inc.) in a 1:2 positive: negative charge ratio, yielding a biphasic ink. Alternatively, flocculation was induced by the addition of zinc acetate. Methylcellulose (Methocel F4M, Dow Chemical Co., Midland, Mich.) was added, at a concentration of 10 mg/ml, to increase the solution viscosity.

Rheology of the Biphasic Ink

Figure 4:
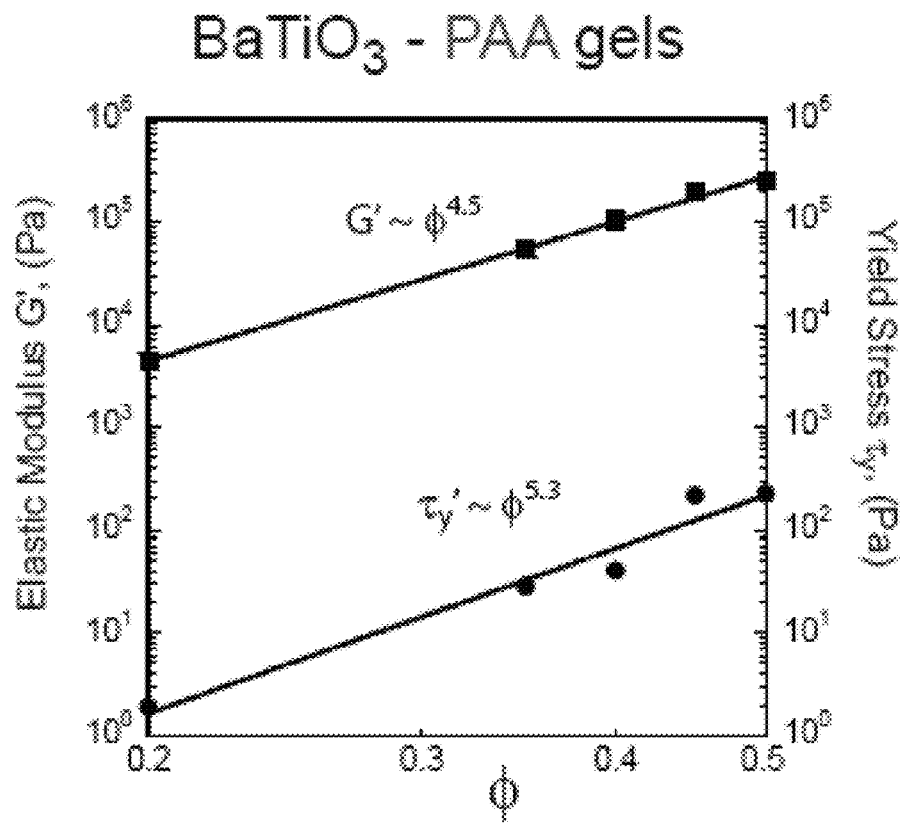
FIG. 4 illustrates the dependency of the rheological properties upon the volume fraction of a conventional ink composed exclusively of attractive particles including barium titanate coated with polymer PAA.

FIG. 4 illustrates the dependency of the rheological properties upon the volume fraction of a conventional ink composed exclusively of attractive particles of barium titanate and PAA. The ink exhibited the power law scaling of both the shear elastic modulus and yield stress. This type of behavior compares well with similar studies performed on strong gels of alumina (typically of formula $Al_2O_3$) and a polymer, with a power law exponent of approximately 5.

Figure 5:
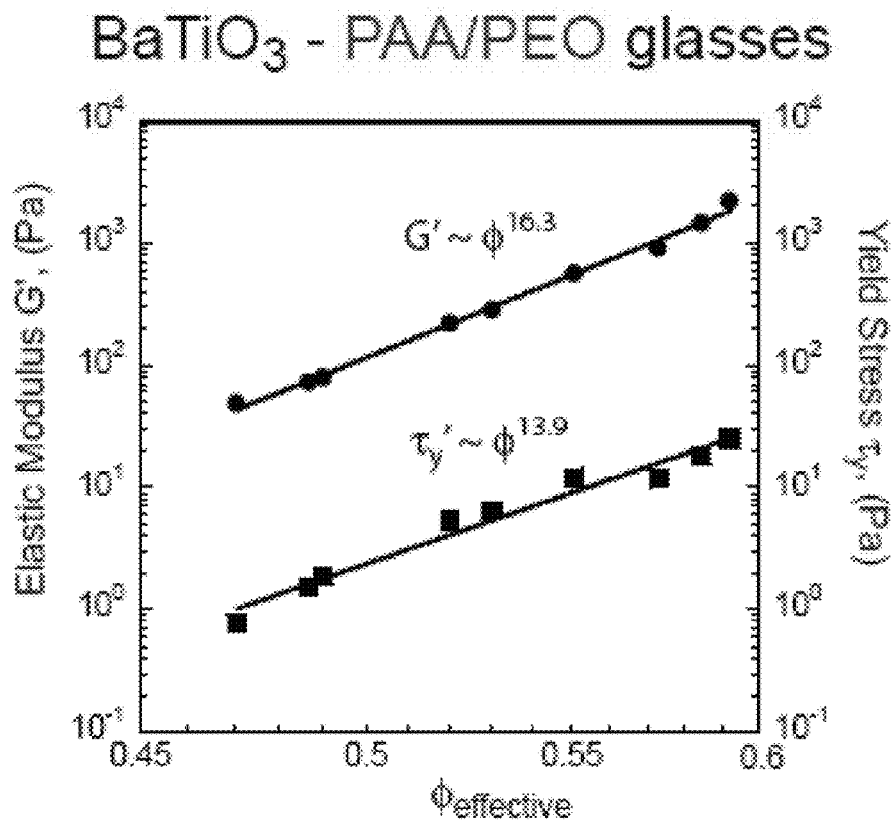
FIG. 5 illustrates the dependency of the rheological properties upon the volume fraction of a conventional ink composed exclusively of repulsive particles of barium titanate coated with comb polymer PAA/PEO.

An ink of repulsive particles of barium titanate coated with comb polymer PAA/PEO also exhibits some elastic behavior at high effective volume fraction, as illustrated in FIG. 5. Without wishing to be bound by any particular theory, it appears that the need to invoke an effective volume fraction arises from the gyration radius ($R_g$) of the PEO side chains, estimated to be about 2.7 nm and therefore a significant fraction of the bare particle radius (about 30 nm), increasing the effective volume fraction by a factor of about 1.3. At the high effective volume fractions of FIG. 5, the suspension exhibits a behavior very similar to that of a hard sphere colloidal glass. The value of the shear elastic modulus and yield stress are orders of magnitude less than that of the attractive inks, but exhibit a much larger dependence on volume fraction.

Figure 6A:
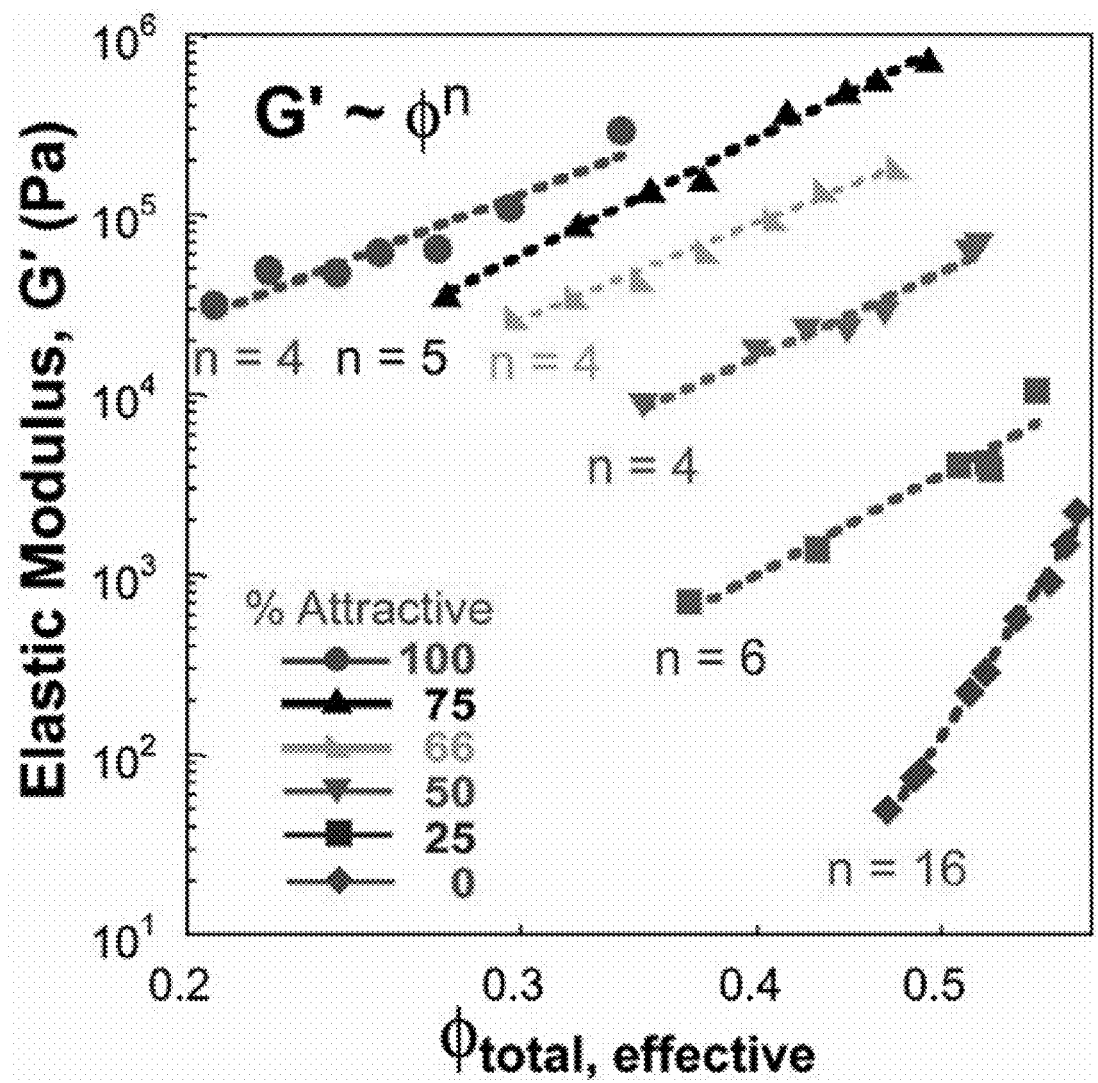
FIG. 6 illustrates the elastic modulus (a), yield stress (b) and compressive yield stress (c) of biphasic nanoparticle inks as compared to those of their constituent attractive and repulsive nanoparticles.
Figure 6B:
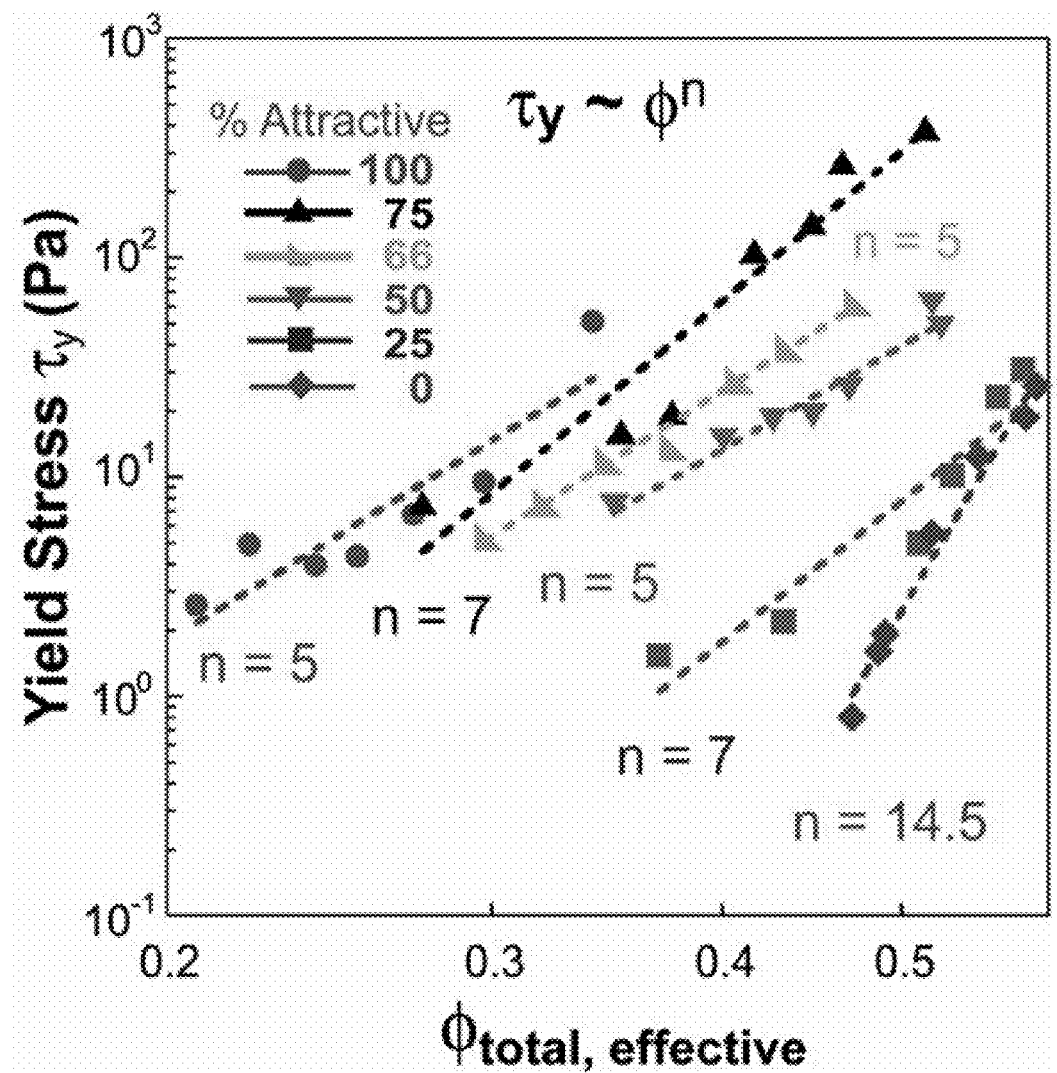
Figure 6C:
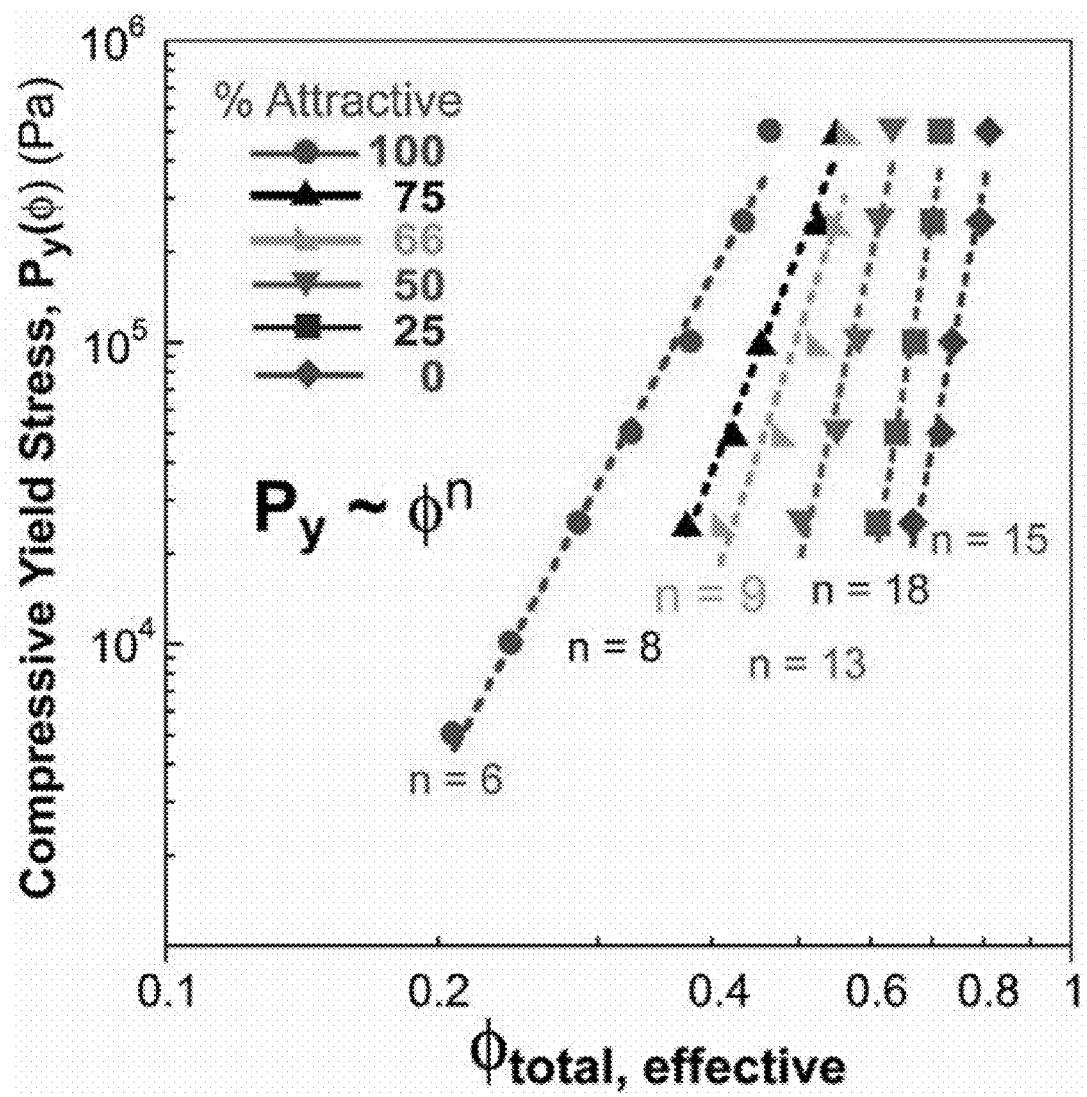

As illustrated by the graphs of FIG. 6, which were taken at varying percentages of attractive nanoparticles, biphasic nanoparticle inks display scaling behavior intermediate to that of their constituent attractive and repulsive nanoparticles. Interestingly, the compressive yield stress (FIG. 6c) of the biphasic inks exhibits a much higher volume fraction dependence than the yield stress (FIG. 6b). This indicates that as volume fraction increases, the resistance to compressive yielding increases at a faster rate than the resistance to shear flow. Due to this difference in scaling, biphasic inks may prove to be more resistant to filter pressing and clogging.

Ink Deposition for Direct Writing:

Approximately 1 ml of biphasic ink was loaded into a 3 ml syringe, and a small plastic stopper was inserted behind the ink to facilitate the application of air pressure to drive the deposition process. A pulled-glass syringe tip with a luer-lock fitting was attached and the syringe tip was manually aligned and positioned near the surface. A reservoir of lamp oil was added dropwise to the substrate. Deposition of the ink within this reservoir prevented and uneven drying of 3-D structures, thus minimizing drying stresses and the defects associated therewith. Air pressure was used to design and control the path of the syringe tip through three dimensions. While applied air pressure was controlled manually, the deposition speed and the height between layers were controlled via software. Typically applied air pressures were between 30 and 50 psi, and typical build speeds were 0.5 mm/second.

Figure 7:
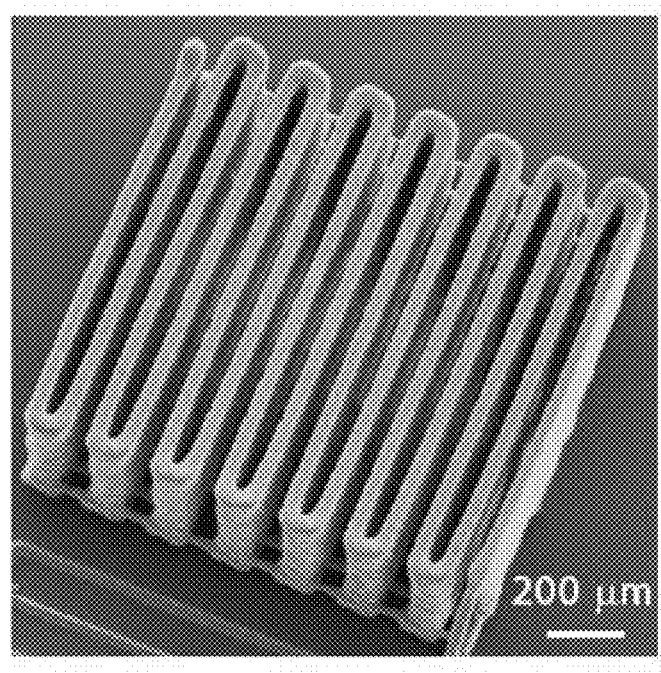
FIG. 7 is a scanning electron microscopy (SEM) image of a structure manufactured with a biphasic ink.
Figure 8:
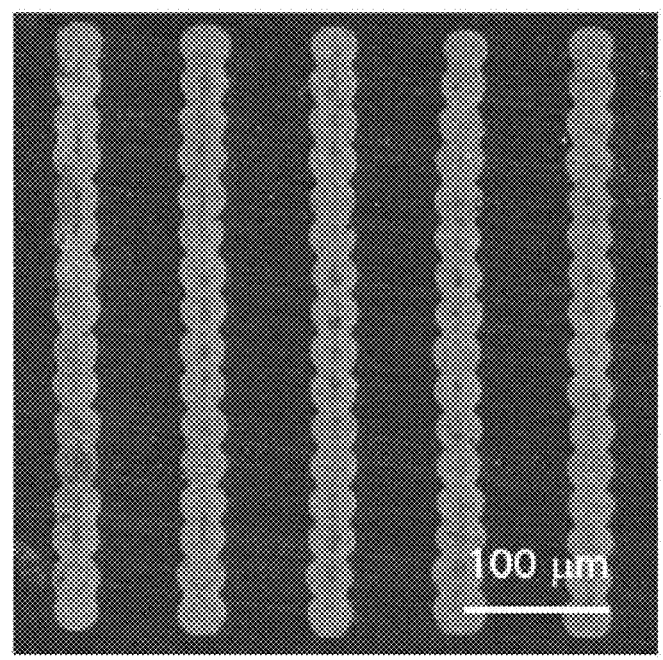
FIG. 8 is a cross-section image of an epoxy-infiltrated structure.

The biphasic ink is characterized by a high elastic modulus, shear yield stress, and compressive yield stress so that in the deposition of a multi-layered structure each layers maintains its shape while subsequent layers are formed on top. This allows for the creation of high aspect ratio structures, where the ink used must have a high yield stress so that each layer maintains its shape while subsequent layers are formed on top. FIG. 7 includes a scanning electron microscopy (SEM) image of a structure manufactured with the above biphasic ink. In this example, 16 layer structures were built by repetition of a single 2D pattern with 30 μm wide lines. A biphasic ink was used with a 2:1 ratio of attractive to repulsive particles. FIG. 8 includes a cross-section of an epoxy-infiltrated structure showing the distinct layers that make up the structure.

Figure 9:
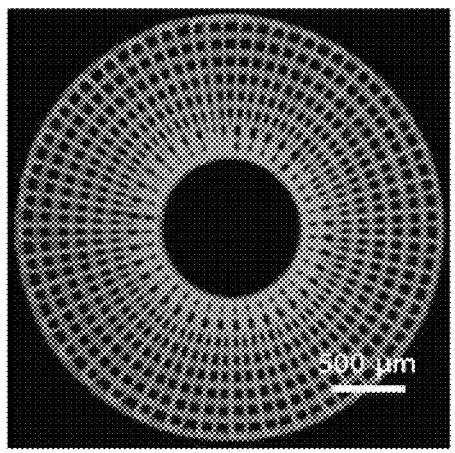
FIG. 9 contains images of spanning structures manufactured with biphasic inks using a 30 micron nozzle.
Figure 9:
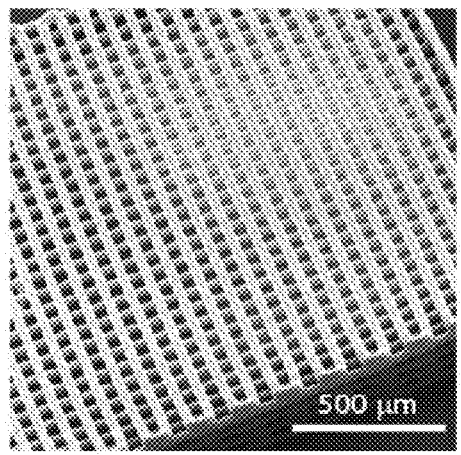
Figure 10:
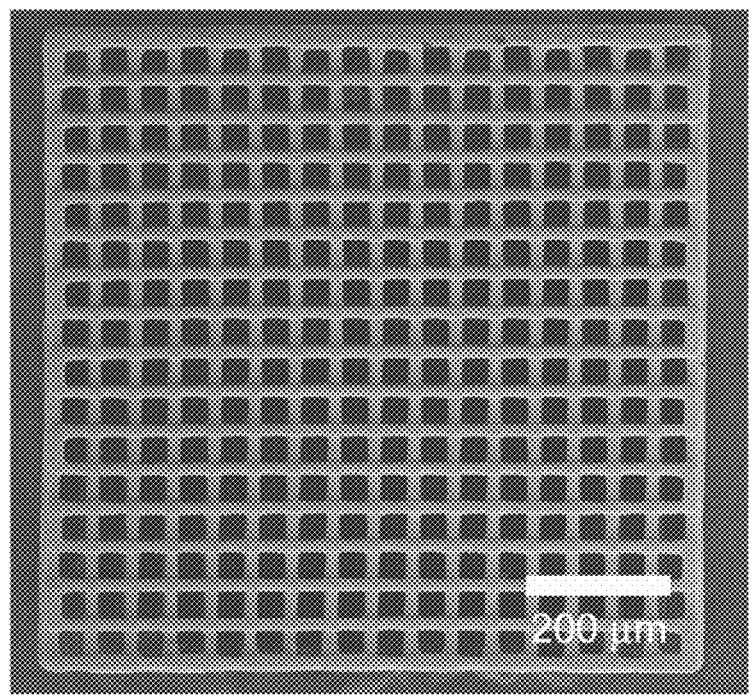
FIG. 10 is an image of a spanning structure manufactured with biphasic inks using a 10 micron nozzle.

The biphasic ink also experiences a rapid restoration of its elastic modulus and yield stress upon exiting the nozzle, a feature which enables the creation of structures with spanning segments (i.e., segments unsupported by an underlying layer). The radial and tetragonal lattice structures of FIGS. 9 and 10 are examples of spanning structures written using a 30 μm and 10 μm tip, respectively, and a biphasic ink with a 1:1 ratio of attractive to repulsive particles.

Example 2

Preparation of Hydrophobic Colloids/Hydrophilic Colloids Biphasic Inks

Monodisperse colloidal silica microspheres were synthesized by the base-catalyzed condensation of tetraethyl orthosilicate. [40, 41] Three separate particle batches were used. Their average diameters, as assessed from scanning electron microscopy (SEM) photomicrographs, were <2a1>=0.68±0.04 microns, <2a2>=0.72 ±0.02 microns, and <2a3>=0.62±0.03 microns. The dry density of silica microspheres is assumed to be ρ=1.9 g/mL [18]. The first two batches were labeled with rhodamine (RITC, Sigma-Aldrich, St. Louis, Mo.) and fluorescein (FITC, Sigma-Aldrich), respectively. The third batch was synthesized without dye, and was referred to as "plain" particles.

The surface chemistries of control populations of rhodamine-labeled and plain particles were rendered partially hydrophobic by chemically attaching linear hydrocarbon chains to their surfaces according to the following procedure. 0.6 g of silica particles were dispersed in 36 g of toluene (Sigma-Aldrich, St. Louis, Mo.) by means of ultrasonication (model 550 Sonic Dismembrator, Fisher Scientific, Pittsburgh, Pa.) for 30 s pulsed at a 1 second on/off cycle. 40 microliters of n-octyldimethylchlorosilane (Gelest, Morrisville, Pa.) was then added as a hydrophobic silane-coupling agent to the suspension drop-wise under vigorous stirring, followed by 80 microliters of triethylamine (Sigma-Aldrich, St. Louis, Mo.), which served as an acid scavenger to remove the reaction byproducts. The mixture was refluxed at approximately 55° C., while stirring for 15 hours. The hydrophobic particles were then washed by four cycles of centrifugation and redispersion in toluene, and subsequently dried at room temperature. These particles flocculated when suspended in polar carrier liquids, such as water and dimethylsulfoxide (DMSO, Sigma-Aldrich, St. Louis, Mo.), due to attractive interactions between their hydrophobic monolayers. Conversely, bare particles remained stable in these carrier liquids, due to repulsive electrostatic interactions.

The silica microspheres were dispersed in the refractive index matching mixture of $H_2O$—DMSO at a volumetric ratio of 1:3. Water pre-adjusted to pH 10.5 was found to minimize attractive interactions between the surface-modified and bare particles. To prepare the biphasic mixtures, the appropriate amounts of dry, surface-modified and bare particles, and the $H_2O$—DMSO carrier liquid were mixed and sonicated (model 550 Sonic Dismembrator, Fisher Scientific) for 30 s at a 1 s on/off cycle. This sonication step was sufficient to break up the hydrophobic particle clusters, yielding a representative biphasic mixture at $\phi_{att}$=0.05, $\phi_{rep}$=0.42 (where $\phi_{att}$ and $\phi_{rep}$ denote the volume fractions of the surface-modified and bare particles, respectively).

REFERENCES

1. Weeks, E. R.; Crocker, J. C.; Levitt, A. C.; Schofield, A.; Weitz, D. A., Three-Dimensional Direct Imaging of Structural Relaxation Near the Colloidal Glass Transition. *Science* 2000, 287, 627-631.
2. Manley, S.; Wyss, H. M.; Miyazaki, K.; Conrad, J. C.; Trappe, V.; Kaufman, L. J.; Reichman, D. R.; Weitz, D. A., Glasslike Arrest in Spinodal Decomposition as a Route to Colloidal Gelation. *Phys. Rev. Lett.* 2005, 95, Art. No. 238302.
3. Trappe, V.; Prasad, V.; Cipelletti, L.; Segre, P. N.; Weitz, D. A., Jamming phase diagram for attractive particles. *Nature* 2001, 411, 772-775.
4. Anderson, V. J.; Lekkerkerker, H. N. W., Insights into phase transition kinetics from colloid science. *Nature* 2002, 416, 811-815.
5. Lewis, J. A., Colloidal Processing of Ceramics. *J. Am. Cer. Soc.* 2000, 83, (10), 2341-2359.
6. Martinez, C. J.; Lewis, J. A., Shape Evolution and Stress Development During Latex-Silica Film Formation. *Langmuir* 2002, 18, 4689-4698.
7. Smay, J. E.; Gratson, G. M.; Shepherd, R. F.; Cesarano, J.; Lewis, J. A., Directed Colloidal Assembly of 3D Periodic Structures. *Adv. Mater.* 2002, 14, (18), 1279-1283.
8. Fichtner, M.; Fuhr, O.; Kircher, O.; Rothe, J., Small Ti clusters for catalysis of hydrogen exchange in NaAlH4. *Nanotechnology* 2003, 14, (7), 778-785.
9. Kim, A. S.; Yuan, R., Cake resistance of aggregates formed in the diffusion-limited-cluster-aggregation (DLCA) regime. *J. Membrane Science* 2006, 286, (1-2), 260-268.
10. Smay, J. E.; Cesarano, J.; Lewis, J. A., Colloidal Inks for Directed Assembly of 3-D Periodic Structures. *Langmuir* 2002, 18, (14), 5429-5437.
11. Weitz, D. A.; Oliveria, M., Fractal Structures Formed by Kinetic Aggregation of Aqueous Gold Colloids. *Phys. Rev. Lett.* 1984, 52, 1433-1436.
12. Carpineti, M.; Giglio, M., Transition from Semiorder to Disorder in the Aggregation of Dense Colloidal Solutions. *Phys. Rev. Lett.* 1993, 70, (24), 3828-3830.
13. Chen, M.; Russel, W. B., Characteristics of Flocculated Silica Dispersions. *J. Colloid Interface Sci.* 1991, 141, 564-577.
14. Varadan, P.; Solomon, M. J., Direct visualization of long range structural heterogeneity in colloidal gels. *Langmuir* 2003, 19, (3), 509-512.
15. Hutter, M., Local Structure Evolution in Particle Network Formation Studied by Brownian Dynamics Simulation. *J. Colloid and Interface Sci.* 2000, 231, 337-350.
16. Dinsmore, A. D.; Prasad, V.; Wong, I. Y.; Weitz, D. A., Microscopic Structure and Elasticity of Weakly Aggregated Colloidal Gels. *Phys. Rev. Lett.* 2006, 96, Art. No. 185502.
17. Ramakrishnan, S.; Zukoski, C. F., Microstructure and Rheology of Thermoreversible Nanoparticle Gels. *Langmuir* 2006, 22, 7833-7842.
18. Ramakrishnan, S.; Gopalakrishnan, V.; Zukoski, C. F., Clustering and mechanics in dense depletion and thermal gels. *Langmuir* 2005, 21, 9917-9925.
19. Chung, B.; Ramakrishnan, S.; Bandyopadhyay, R.; Liang, D.; Zukoski, C. F.; Harden, J. L.; Leheny, R. L., Microscopic Dynamics of Recovery in Sheared Depletion Gels. *Phys. Rev. Lett.* 2006, 96, Art. No. 228301.
20. Krall, A. H.; Weitz, D. A., Internal Dynamics and Elasticity of Fractal Colloidal Gels. *Phy Rev Lett* 1998, 80, (4), 778-781.
21. Weeks, E. R.; Weitz, D. A., Properties of cage rearrangements observed near the colloidal glass transition. *Phys. Rev. Lett.* 2002, 89, (Art. No. 095704).
22. Puertas, A. M.; Fuchs, M.; Cates, M. E., Dynamical heterogeneities close to a colloidal gel. *J. Chem Phys.* 2004, 121, (6), 2813-2822.
23. Puertas, A. M.; Fuchs, M.; Cates, M. E., Dynamical Heterogeneity in Colloidal Gelation A Simulation Study. *J. Phys. Chem.* 2005, 109, 6666-6675.
24. Kegel, W. K.; van Blaaderen, A., Direct Observation of Dynamical Heterogeneities in Colloidal Hard-Sphere Suspensions. *Science* 2000, 287, 290-293.
25. Crocker, J. C.; Grier, D. G., Methods of Digital Video Microscopy for Colloidal Studies. *J. Colloid and Interface Sci.* 1996, 179, 298-310.
26. Dinsmore, A. D.; Weitz, D. A., Direct imaging of three-dimensional structure and topology of colloidal gels. *J. Phys. Cond. Matter* 2002, 14, (33), 7581-7597.
27. Dibble, C. J.; Kogan, M.; Solomon, M. J., Structure and dynamics of colloidal depletion gels: Coincidence of transitions and heterogeneity. *Phys. Rev. E.* 2006, 74, (4), Art. No. 041403.
28. Leunissen, M. E.; Christova, C. G.; Hynninen, A.; Royall, C. P.; Campbell, A. I.; Imhof, A.; Dijkstra, M.; van Roij, R.; van Blaaderen, A., Ionic colloidal crystals of oppositely charged particles. *Nature* 2005, 437, (8), 235-240.
29. van Blaaderen, A.; Ruel, R.; Wiltzius, P., Template-directed colloidal crystallization. *Nature* 1997, 385, 321-324.
30. Lee, W.; Chan, A.; Bevan, M. A.; Lewis, J. A.; Braun, P. V., Nanoparticle-Mediated Epitaxial Assembly of Colloidal Crystals on Patterned Substrates. *Langmuir* 2004, 20, (5262-5270).
31. Solomon, T.; Solomon, M. J., Stacking fault structure in shear-induced colloidal crystallization. *J. Chem Phys.* 2006, 124, Art. No. 134905.
32. Schall, P.; Cohen, I.; Weitz, D. A.; Spaepen, F., Visualization of Dislocation Dynamics in Colloidal Crystals. *Science* 2004, 305, 1944-1948.
33. Mohraz, A.; Solomon, M. J., Direct Visualization of Colloidal Rod Assembly by Confocal Microscopy. *Langmuir* 2005, 21, (12), 5298-5306.
34. Pham, Q. T.; Puertas, A. M.; Bergenholtz, J.; Egelhaaf, S. U.; Moussaid, A.; Pusey, P. N.; Schofield, A. B.; Cates, M. E.; Fuchs, M.; Poon, W. C. K., Multiple Glassy States in a Simple Model System. *Science* 2002, 296, 104-106.
35. Segre, P. N.; Prasad, V.; Schofield, A.; Weitz, D. A., Glasslike kinetic arrest at the colloidal-gelation transition. *Physical Review Letters* 2001, 86, (26).

36. Scheidler, P.; Kob, W.; Binder, K., Cooperative motion and growing length scales in supercooled confined liquids. *Europhys. Lett.* 2002, 59, 701-707.

37. Kim, K.; Yamamoto, R., Apparent finite-size effects in the dynamics of supercooled liquids. *Phys. Rev. E* 2000, 61, R41-R44.

38. Malek, K.; Coppens, M. O., Effects of surface roughness on self- and transport diffusion in porous media in the Knudsen regime. *Phys. Rev. Lett.* 2001, 87, (12), Art. No. 125505.

39. Elimelech, M.; O'Mella, C. R., Kinetics of Deposition of Colloidal Particles in Porous Media. *Environmental Science and Technology* 1990, 24, 1528-1536.

40. Bogush, G. H.; Tracy, M. A.; Zukoski IV, M. A., Preparation of monodisperse silica particles: Control of size and mass fraction. *Journal of Non-Crystalline Solids* 1988, 104, 95-106.

41. Van Blaaderen, A.; Vrij, A., Synthesis and Characterization of Colloidal Dispersions of Fluorescent, Monodisperse Silica Spheres. *Langmuir* 1992, 8, 2921-2931.

42. Dinsmore, A. D.; Weeks, E. R.; Prasad, V.; Levitt, A. C.; Weitz, D. A., Three-dimensional confocal microscopy of colloids. *Appl. Opt.* 2001, 40, (24), 4152-4159.

43. Hansen, J. P.; McDonald, I. R., *Theory of Simple Liquids*. 3rd Edition ed.; Academic Press: San Diego, 2006.

44. Baxter, R. J., Percus-Yevick equation for hard spheres with surface adhesion. *J. Chem. Phys.* 1968, 49, 2770-2774.

45. Shih, W.-H.; Shih, W. Y.; Kim, S.; Liu, J.; Aksay, I. A., Scaling behavior of the elastic properties of colloidal gels. *Phys. Rev. A* 1990, 42, (8), 4772-4779.

46. de Rooij, R. D.; Ende, v. d.; Duits, M. H. G.; Mellema, J., Elasticity of weakly aggregating polystyrene latex dispersions. *Phys. Rev. E* 1994, 49, 3038.

47. Potanin, A. A.; de Rooij, R.; Van den Ende, D.; Mellema, J., Microrheological modeling of weakly aggregated dispersions. *J. Chem. Phys.* 1995, 102, (14), 5845-5853.

48. Wolthers, W.; Van den Ende, D.; Breedveld, V.; Duits, M. H. G.; Potanin, A. A.; Wientjes, R. H. W.; Mellema, J., Linear viscoelastic behavior of aggregated colloidal dispersions. *Phys. Rev. E* 1997, 56, (5), 5726-5733.

49. Mellema, M.; van Opheusden, J. H. J.; van Vliet, T., Categorization of rheological scaling models for particle gels applied to casein gels. *J. Rheol.* 2002, 46, (1), 11-29.

50. Mohraz, A.; Solomon, M. J., Orientation and rupture of fractal colloidal gels during start-up of steady shear flow. *J. Rheology* 2005, 49, (3), 657-681.

51. Eckert, T.; Bartsch, E., Re-entrant Glass Transition in a Colloid-Polymer Mixture with Depletion Attractions. *Phys. Rev. Lett.* 2002, 89, (12), Art. No. 125701.

52. Kirby H. K.; Harris D. J., Poly(acrylic acid)-poly(ethylene oxide) comb polymer effects on BaTiO3 nanoparticle suspension stability. *J. Am. Cer. Soc.* 2004, 87, (2), 181-186.

53. Li Q.; Lewis J. A., Nanoparticle inks for directed assembly of three-dimensional periodic structures *Adv. Mater.* 2003, 15, (19), 1639-1643.

54. Cesarano III J., Calvert P. D., Freeforming objects with low-binder slurry. U.S. Pat. No. 6,027,326, Feb. 22, 2000.

55. Lewis J. A., Kirby G., Controlled dispersion of colloidal suspensions by comb polymers. U.S. Pat. No. 7,053,125, May 20, 2004.

56. Stevens, *Polymer Chemistry: An Introduction*, $3^{rd}$ ed., Oxford University Press, 1999.

57. D. H. Napper, *Polymeric Stabilization of Colloidal Dispersions*, Academic Press, 1983 (pp. 28-30).

58. Brem H., Langer R. S., Domb A. J., Controlled local delivery of chemotherapeutic agents for treating solid tumors. U.S. Pat. No. 5,651,986, Jul. 29, 1997.

59. Igari Y., Yamada M., Ogawa Y., Water-soluble composition for sustained-release containing epo and hyaluronic acid. U.S. Pat. No. 5,416,071, May 16, 1995.

60. Machida M., Arakawa M., Sustained-release particulate preparation and process for preparing the same. European Patent No. 0263490, Jan. 4, 1995.

61. Zukoski C. F., Material properties and the electrorheological response. *Ann. Rev. Mat. Sci.* 1993, 23, 45-78.

62. Lewis J. A., et al., Direct Ink Writing of Three-Dimensional Ceramic Structures. *J. Am. Ceram. Soc.* 2006, 89 [12], 3599-3609.

63. Mohraz A., Weeks E. R., Lewis J. A., Structure and Dynamics of Biphasic Colloidal Mixtures. *Phys. Rev. E* 2008, 77, 060403(R), 1-4.

What is claimed is:

1. A biphasic ink, comprising:
a gel phase comprising a plurality of flocculated particles in a carrier liquid, the flocculated particles comprising attractive particles and an attractive dispersant, and
a fluid phase comprising a plurality of dispersed particles in the carrier liquid, the dispersed particles comprising repulsive particles and a repulsive dispersant, the repulsive dispersant comprising a comb polymer including ionizable and nonionizable side-chains.

2. The biphasic ink of claim 1, wherein a ratio Wa:Wr is 1:10 to 10:1, Wa is the weight of the attractive particles, and Wr is the weight of the repulsive particles.

3. The biphasic ink of claim 1, wherein a ratio Wa:Wr is 1:2.5 to 2.5:1, Wa is the weight of the attractive particles, and Wr is the weight of the repulsive particles.

4. The biphasic ink of claim 1, wherein the attractive particles comprise a polymer, wherein each monomer unit of the polymer comprises an ionizable side-chain.

5. The biphasic ink of claim 1, wherein the comb polymer is PAA/PEO.

6. The biphasic ink of claim 1, wherein the carrier liquid is selected from the group consisting of water, methanol, propanol, ethanol, and t-butanol, N,N-dimethylformamide (DMF), dimethyl sulfoxide (DMSO), acetone, acetonitrile, acetic acid, hexamethylphosphoric triamide (HMPA), tetrahydrofuran (THF), N,N-dimethylacetamide, N-methyl-2-pyrrolidone, tetramethyl urea, glycerol, ethylene glycol, and mixtures thereof.

7. The biphasic ink of claim 1, wherein the carrier liquid comprises water.

8. The biphasic ink of claim 1, wherein the attractive particles have an average effective diameter of 20 nanometers to 3 microns.

9. The biphasic ink of claim 1, wherein the repulsive particles have an average effective diameter of 20 nanometers to 3 microns.

10. The biphasic ink of claim 1, wherein the attractive particles and the repulsive particles are independently selected from the group consisting of metals, ceramic, ceramic precursors, semiconductors, polymers, bioactive agents, and mixtures thereof.

11. The biphasic ink of claim 1, further comprising a flocculant.

12. The biphasic ink of claim 11, wherein the flocculant is selected from the group consisting of multivalent salts, cationic polyelectrolytes, anionic polyelectrolytes, and mixtures thereof.

13. The biphasic ink of claim 1, further comprising a viscosity modifier.

14. The biphasic ink of claim 13, wherein the viscosity modifier is selected from the group consisting of methylcellulose, hydroxypropyl methylcellulose, hydroxyethyl methylcellulose, guar gum, poly(ethylene oxide), xanthan gum, alginate, starch, polyvinyl alcohol, polyethylene glycol, carrageenan and mixtures thereof.

15. The biphasic ink of claim 1, wherein the carrier liquid comprises a molarity of 0.1 or greater of monovalent ions.

16. The biphasic ink of claim 15, wherein the molarity is 0.5 or greater.

17. The biphasic ink of claim 1, wherein the carrier liquid comprises a molarity of 0.001 or greater of multivalent ions.

18. The biphasic ink of claim 17, wherein the molarity is 0.01 or greater.

19. The biphasic ink of claim 1, comprising a total effective volume fraction, $\phi_{total,effective}$, of attractive and repulsive particles of from about 0.3 to about 0.7.

20. The biphasic ink of claim 1 comprising an elastic modulus, G', of from about $10^3$ to about $10^6$ Pa.

21. A method for making a biphasic ink, comprising:
    forming attractive particles by mixing first particles, a first carrier liquid and an attractive dispersant;
    forming repulsive particles by mixing second particles, a second carrier liquid and a repulsive dispersant, the repulsive dispersant comprising a comb polymer including ionizable and nonionizable side-chains;
    mixing the attractive particles and the repulsive particles in a combined carrier liquid comprising the first and second carrier liquids, and
    forming a gel phase and a fluid phase, the gel phase comprising a plurality of flocculated particles comprising the attractive particles and the attractive dispersant in the combined carrier liquid; and the fluid phase comprising a plurality of dispersed particles comprising the repulsive particles and the repulsive dispersant in the combined carrier liquid, thereby making the biphasic ink.

22. The method of claim 21, further comprising mixing a flocculant with the biphasic ink.

23. The method of claim 21, wherein the biphasic ink has a ratio Wa:Wr is 1:10 to 10:1, Wa is the weight of the attractive particles, and Wr is the weight of the repulsive particles.

24. The method of claim 21, wherein the biphasic ink has a ratio Wa:Wr is 1:2.5 to 2.5:1, Wa is the weight of the attractive particles, and Wr is the weight of the repulsive particles.

* * * * *